(12) United States Patent
Kutsuzawa

(10) Patent No.: US 11,468,709 B2
(45) Date of Patent: Oct. 11, 2022

(54) IMAGE FORMING APPARATUS

(71) Applicant: Konica Minolta, Inc., Tokyo (JP)

(72) Inventor: Ayana Kutsuzawa, Toyokawa (JP)

(73) Assignee: Konica Minolta, Inc., Tokyo (JP)

( * ) Notice: Subject to any disclaimer, the term of this patent is extended or adjusted under 35 U.S.C. 154(b) by 237 days.

(21) Appl. No.: 16/832,525

(22) Filed: Mar. 27, 2020

(65) Prior Publication Data
US 2020/0311393 A1  Oct. 1, 2020

(30) Foreign Application Priority Data

Mar. 29, 2019  (JP) .............................. JP2019-065635

(51) Int. Cl.
*G06V 40/16* (2022.01)
*H04N 1/00* (2006.01)

(52) U.S. Cl.
CPC .......... *G06V 40/176* (2022.01); *G06V 40/165* (2022.01); *G06V 40/167* (2022.01);
(Continued)

(58) Field of Classification Search
CPC .. G06V 40/176; G06V 40/165; G06V 40/167; G06V 40/172; G06V 40/174; G06V 10/17; G06V 40/193; G06V 20/52; G06V 40/103; G06V 40/15; G06V 40/20; G06V 40/70; G06V 40/10; G06V 40/16; G06V 40/161; H04N 1/00381; H04N 1/00437; G06K 9/6269; G06K 9/6256; G06K 9/6267; G06K 9/00; G06K 9/6268; G06K 9/6201; G06K 9/6218; G06K 9/6292; G06Q 30/0631; G06Q 50/01; G06Q 30/0643; G06Q 30/0282; G06Q 30/06; G06Q 30/0277; G06Q 30/0281; G06Q 30/0627;
(Continued)

(56) References Cited

U.S. PATENT DOCUMENTS 9,716,599 B1 *  7/2017  Gates ................. G06K 9/00302
2013/0110666 A1 *  5/2013  Aubrey .............. G06K 9/00369
                                                                  705/26.5
(Continued)

FOREIGN PATENT DOCUMENTS

| JP | 2002-258682 A | 9/2002 |
| JP | 2005-056388 A | 3/2005 |
| JP | 2009-017215 A | 1/2009 |

*Primary Examiner* — Nimesh Patel
(74) *Attorney, Agent, or Firm* — Osha Bergman Watanabe & Burton LLP

(57) ABSTRACT

An image forming apparatus includes: an imaging device that captures a reference facial image used for determining a change in a facial expression, and a user facial image; a processor that determines an emotion in the user facial image based on an amount of the change in the facial expression from the reference facial image, and performs message support corresponding to the emotion in the user facial image; and a user interface that detects an input operation by a user without delay in setting a printing condition when a print job is executed in response to a request made by the user. The processor obtains the reference facial image captured by the imaging device at a time point when the user interface detects the input operation without delay and the facial expression is assumed to be a reference for the change in the facial expression.

12 Claims, 15 Drawing Sheets

(52) U.S. Cl.
CPC ....... *G06V 40/172* (2022.01); *H04N 1/00381* (2013.01); *H04N 1/00437* (2013.01)

(58) Field of Classification Search
CPC ........... G06Q 30/0253; G06Q 30/0254; G06Q 30/0267; G06Q 30/0637; G06N 3/0454; G06N 20/00; G06N 3/08; G06N 3/04; G06N 3/004; G06N 3/008; G06N 5/022; G06N 5/003; G06F 3/011; G06F 2203/011; G06F 40/30; G06F 3/012; G06F 16/436; G06F 21/32; G06F 3/015; G06F 3/0482; G06F 3/048; G06F 16/54; G06F 3/0481

See application file for complete search history.

(56) References Cited

U.S. PATENT DOCUMENTS

| | | | |
|---|---|---|---|
| 2016/0196575 A1* | 7/2016 | Uchida | G06Q 30/0251 705/14.45 |
| 2017/0061200 A1* | 3/2017 | Wexler | G06F 16/9535 |
| 2017/0311863 A1* | 11/2017 | Matsunaga | A61B 5/163 |
| 2018/0122096 A1* | 5/2018 | Yang | G06K 9/6202 |
| 2018/0308114 A1* | 10/2018 | Deng | G06K 9/00221 |

* cited by examiner

IMAGE FORMING APPARATUS

CROSS-REFERENCE TO RELATED APPLICATION

The entire disclosure of Japanese patent Application No. 2019-065635, filed on Mar. 29, 2019, is incorporated herein by reference.

BACKGROUND

Technical Field

The present invention relates to an image forming apparatus, and more particularly, to improvement for estimating an emotion of a user when various setting items related to image formation are received from the user.

Description of the Related Art

Emotion estimation is a function of capturing, using a camera, a facial expression of a user who operates an image forming apparatus, performing image processing on a facial image captured by the camera, and determining whether the user is confused. As image forming apparatuses have been multi-functionalized these days, there are not a few users who are confused in operation and stand in front of an image forming apparatus.

If the moment of confusion of the user in front of the image forming apparatus is captured and a help screen is displayed, it becomes possible to allow the confused user to perform appropriate operation, whereby the number of serviceman calls can be reduced.

Meanwhile, there are individual differences in an angle of a mouth or an angle of eyebrows in a person's face, and the original face may appear to be a laughing face or a troubled face not infrequently. Due to such individual differences, an emotion of a person with an angle of a mouth directed slightly upward or an emotion of a person with an angle of eyebrows directed slightly downward cannot be obtained only from a facial image appearing in one still image. There has been a method of estimating an emotion using a reference face as one of emotion estimation that can cope with such individual facial differences.

As a conventional image forming apparatus capable of estimating an emotion, one disclosed in JP 2002-258682 A has been known. In addition, as a method of obtaining a reference face, there have been known a case where a user is allowed to make pre-registration (JP 2005-056388 A) and a case where changes in shape of lips, opening/closing of eyelids, and size of eyes of a user operating an image forming apparatus are captured in real time to set a reference face if the change amount does not exceed a threshold value (JP 2009-017215 A).

In order to display a help image at an appropriate timing in the image forming apparatus mentioned above, it is necessary to detect a change in facial expression to be a sign from a frame image captured by a camera to catch confusion of a user. Such an emotion of confusion appears on a user's face as a mixed facial expression of sorrow and antipathy or a mixed facial expression of happiness and antipathy, for example.

In order to detect a complex facial expression change in which two or more emotions are mixed, an emotionally neutral facial image needs to be set as a reference face. An emotionally neutral facial image indicates what is called expressionlessness, which is a state in which no contraction motion of facial muscles (including frontalis muscle, corrugator muscle, orbicularis oculi muscle, zygomatic muscle, orbicularis oris muscle, and angulus oris muscle) and no contraction of mastication muscles are present, or even if they are present, they are merely subtle differences, and is a state in which no noticeable facial expression changes appear in any of the forehead (upper face), the base of the eyes and nose (center of the face), and the mouth and cheeks (lower face).

According to JP 2005-056388 A, a feature amount extracted from an image of a user is pre-registered as a reference feature before a facial expression is determined, and a change amount from the reference feature is calculated. However, even if such pre-registration is performed, there is no guarantee that the feature amount of the facial image with no expression mentioned above is registered in the image forming apparatus. The significance of registering a facial image with no expression may not be understood by the user, and a reference feature of a facial expression with a slight smile or a strained-looking face may be registered. If such a facial reference feature is pre-registered, recognition accuracy cannot be maintained, and excessive control of displaying a help image for a state without confusion of the user may occur. In addition, since the technique of JP 2005-056388 A requires pre-registration made by the user, it cannot be applied to an image forming apparatus expected to be operated by an unspecified number of people.

Meanwhile, according to JP 2009-017215 A, the presence or absence of changes in local areas, such as lips and eyelids, is used, whereby changes in the entire face cannot be detected. A face that is not expressionless as a whole may be regarded as a reference face.

SUMMARY

One or more embodiments of the present invention provide an image forming apparatus capable of obtaining an expressionless facial image to be a reference for emotion estimation without increasing a processing load.

An image forming apparatus of one or more embodiments captures, using an imager, a reference face to be a reference for a change in facial expression and a face to be determined as a facial image of a user, determines an emotion in the face to be determined on the basis of a change amount of a change in facial expression from the reference face, and performs message support corresponding to the emotion in the face to be determined. The image forming apparatus comprises: a detector that detects an input operation performed by the user without delay in setting a printing condition when a print job is executed in response to a request made by the user; and an image acquirer that obtains, as a reference face, the facial image captured by the imager at a time point when the detector detects the input operation without delay and a facial expression of the user is assumed to be the reference for a change in facial expression.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1:
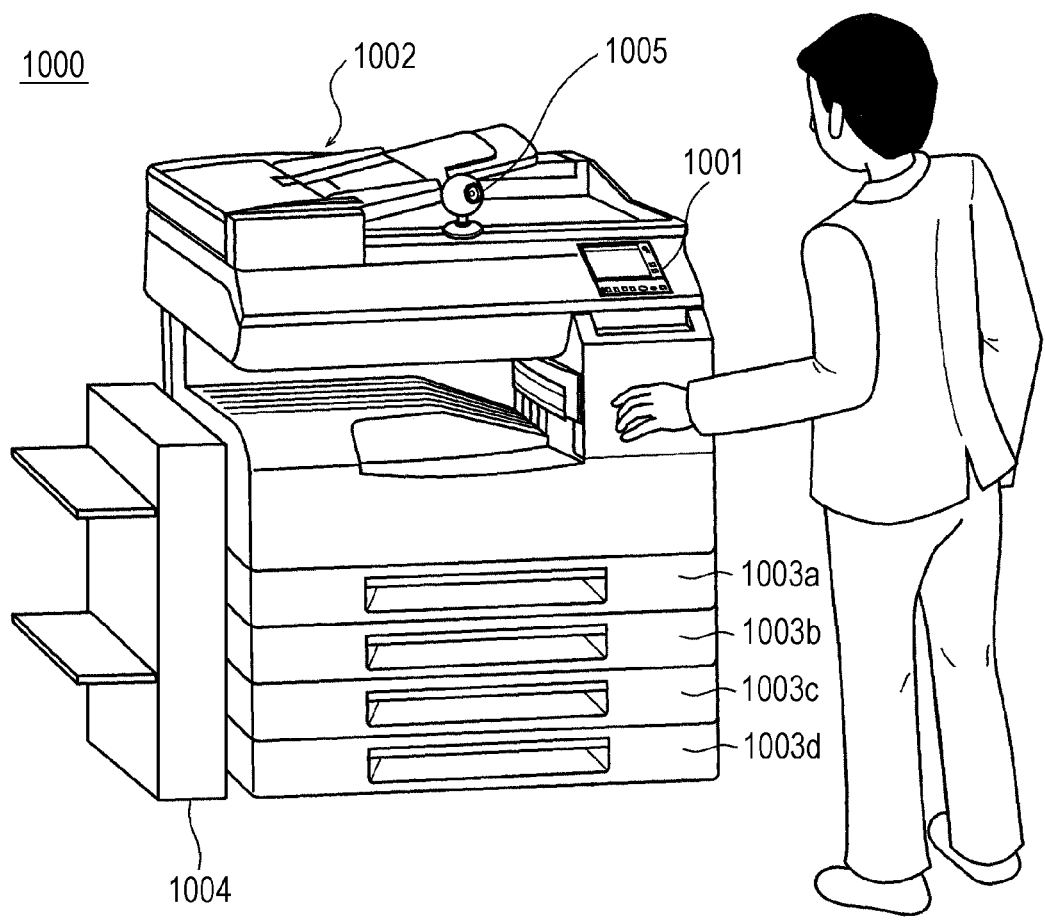
FIG. 1 illustrates an external view of an image forming apparatus according to one or more embodiments of the present invention.

Hereinafter, embodiments of an image forming apparatus will be described with reference to the drawings. However, the scope of the invention is not limited to the disclosed embodiments. FIG. 1 illustrates an external view of the image forming apparatus according to one or more embodiments of the present invention.

[1] Appearance of Image Forming Apparatus

An image forming apparatus 1000 illustrated in FIG. 1 is a multifunction peripheral capable of executing various functions, such as copying, scanning, FAX, and printing, in response to a request from a user, which is connected to a touch panel display 1001 (or user interface) as a display device (or display) and includes an auto document feeder (ADF) 1002, paper feeding cassettes 1003a, b, c, and d, a finisher 1004, and a camera (or imaging device) 1005. When the user requests execution of a print job, it receives input operation made by the user through the connected touch panel display (or detector) 1001, and sets printing conditions. The image forming apparatus 1000 executes the print job on the basis of the printing conditions set in this manner.

The camera 1005 is attached in the vicinity of the touch panel display 1001, and an elevation angle and an azimuth angle are set to catch a face of the user operating the touch panel display 1001. When the user approaches the image forming apparatus 1000, the camera 1005 starts imaging, and starts capturing a frame image at a predetermined frame rate (e.g., 24 Hz, 48 Hz, and 60 Hz). Then, the captured frame image is output in association with a time code. This time code indicates a time point of imaging performed by the camera 1005 with time accuracy of the frame rate mentioned above from the start of the imaging by the user.

[2] Image Forming Apparatus 1000

Figure 2:
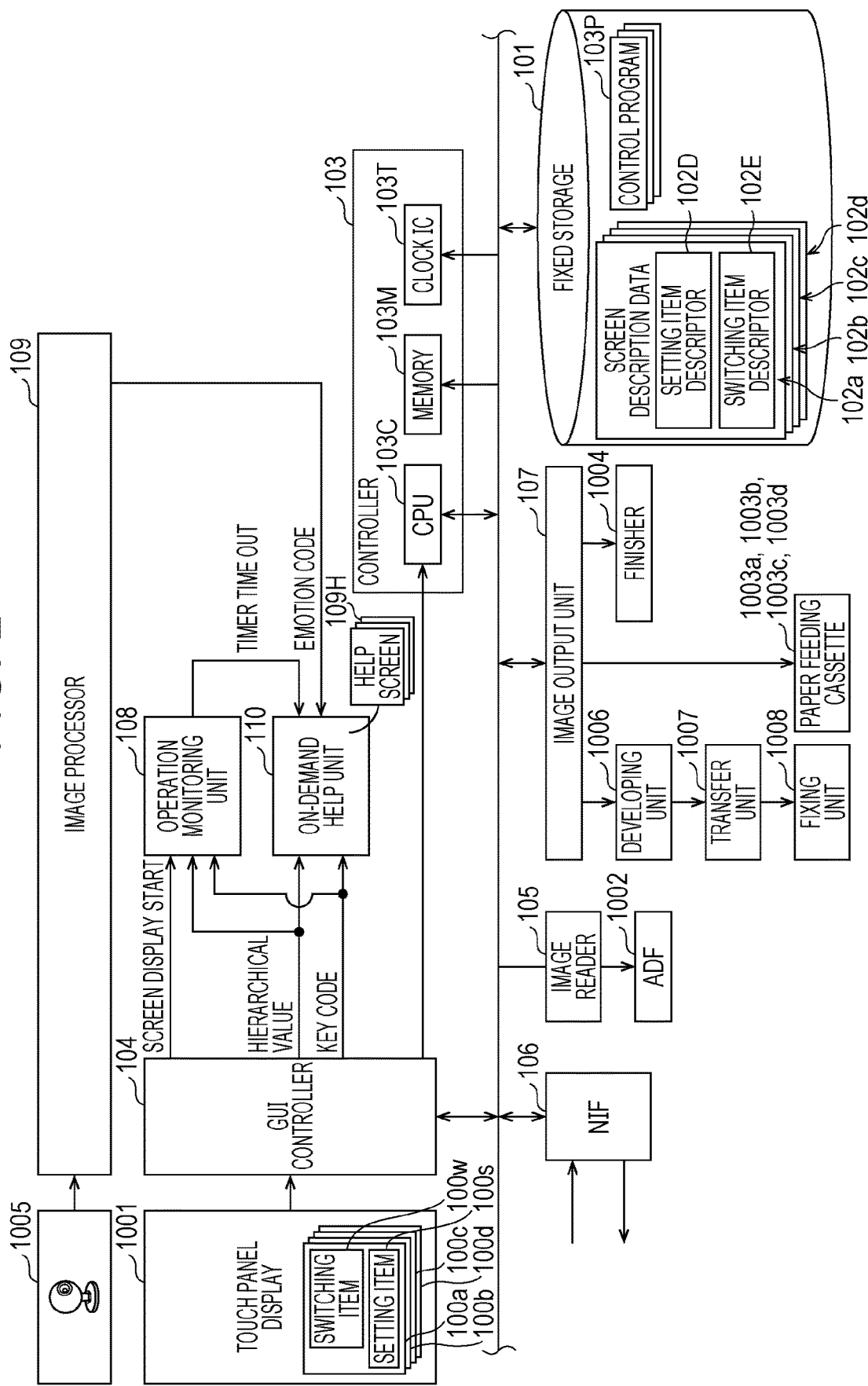
FIG. 2 is a block diagram illustrating an internal configuration of an image forming apparatus according to one or more embodiments.

FIG. 2 is a block diagram illustrating an internal configuration of the image forming apparatus 1000 according to one or more embodiments. Hereinafter, the internal configuration of the image forming apparatus 1000 will be described with reference to this block diagram.

As illustrated in FIG. 2, the image forming apparatus 1000 includes a fixed storage 101, screen description data 102a, b, c, d, and so on, a controller 103 (including central processing unit (CPU)) 103C, memory 103M, and clock integrated circuitry (IC) 103T), a graphical user interface (GUI) controller (including a central processing unit (CPU) 104, an image reader 105, a network interface 106, an image output unit 107, an operation monitoring unit 108 (including a central processing unit (CPU) and a memory), an image processor 109, and an on-demand help unit 110.

(2-1) Fixed Storage 101

The fixed storage 101 is, for example, a hard disk device to which the screen description data 102a, b, c, d, and so on (including setting item descriptor 102D and switching item descriptor 102E) and a control program 103P are installed in advance.

(2-2) Screen Description Data 102

The screen description data 102 is data that defines a screen structure of setting screens 100a, b, c, d, and so on of the printing conditions displayed on the touch panel display 1001, and is described in a screen description language that can be interpreted by the browser of the GUI controller 104. The setting screens 100a, b, c, d, and so on of the touch panel display 1001 receive input of printing condition settings using a setting item 100s and a switching item 100w. Both of the setting item 100s and the switching item 100w are softkeys (keys drawn with GUI components), and the screen description data 102 includes the setting item descriptor 102D that defines the setting item 100s, and the switching item descriptor 102E that defines the switching item 100w.

The setting item descriptor 102D includes arrangement coordinates of the softkey in the display coordinate system of the touch panel display 1001, graphics data to be a type face and a graphic frame of the softkey, key codes to be output in response to softkey touching, and a call statement of an application programming interface (API) function to be executed when the softkey is touched. In the API function call statement, specific parameters corresponding to the printing conditions are set as arguments.

The switching item descriptor 102E includes arrangement coordinates of the softkey in the display coordinate system of the touch panel display 1001, graphics data to be a type face and a graphic frame of the softkey, key codes to be output in response to softkey touching, and a call statement of a browser function to be executed when the softkey is touched. In the browser function call statement, an identifier of the screen description data 102 to be a destination of the screen switching is set as an argument, and the GUI controller 104 is instructed to switch the screen to the screen description data 102 to be the destination of the screen switching.

(2-3) Controller 103

The controller 103 includes, in addition to the CPU 103C, the memory 103M, and the clock IC 103T, the control program 103P loaded from the fixed storage 101 to the memory 103M. When the image forming apparatus 1000 is activated, the CPU 103C loads the control program 103P into the memory 103M, and fetches, decodes, and executes the operation code included in the control program 103P.

Furthermore, the CPU 103C controls document reading performed by the image reader 105 and image output performed by the image output unit 107 in accordance with the API function call statement in the setting item descriptor. At this time, various printing conditions are set in the image reader 105 and the image output unit 107 on the basis of the arguments set at the time of executing the API function call statement. Typical examples of such printing conditions include a color/monochrome setting, staple setting, setting of the number of copies, paper sheet setting, and card copy setting.

The clock IC 103T clocks the current time in a time zone to which the image forming apparatus 1000 belongs. The time code added to the frame image by the camera 1005 is based on the time clocked by the clock IC 103T.

(2-4) GUI Controller 104

The GUI controller 104 includes a browser capable of deciphering data described in the screen description language, and causes the touch panel display 1001 to display the hierarchized setting screens 100a, b, c, and so on on the basis of the screen description data 102a, b, c, d, and so on. When the user touches the touch panel display 1001, the setting item 100s or the switching item 100w included in the setting screens 100a, b, c, d, and so on, which corresponds to the touched coordinate, is activated, and the CPU 103C is caused to execute the API function call statement corresponding to the setting item 100s and the browser function call statement corresponding to the switching item 100w. Furthermore, the key code of the touched setting item 100s and the hierarchical value of the setting screens 100a, b, c, d, and so on to which the setting item 100s belongs are output to the operation monitoring unit 108. Here, the hierarchical value is a numerical parameter for identifying the depth of the hierarchy of each setting screen drawn on the basis of the screen description data 102, which indicates, in the hierarchical structure including the setting screens 100a, b, c, d, and so on, how many times the switching operation is required to reach the setting screen from the top basic screen.

(2-5) Image Reader 105

The image reader 105 drives the auto document feeder (ADF) 1002 in accordance with the control based on the control program 103P, optically reads a document sheet face conveyed by the ADF 1002, and obtains image data for one page. In this reading, the size of the document to be read is a value set by the setting item descriptor 102D.

(2-6) Network Interface (NIF) 106

When a print job is requested from a terminal (not illustrated) in the network system to which the image forming apparatus 1000 belongs, the NIF 106 receives, from the terminal, job data indicating printing conditions and page image data to be subject to image formation.

(2-7) Image Output Unit 107

According to the printing condition settings made by the control program 103P, the image output unit 107 supplies paper sheets from the paper feeding cassettes 1003a, b, c, and d, forms toner images of Y, M, C, and K colors using a developing unit 1006, transfers the toner images using a transfer unit 1007, thermally fixes the toner images using a fixing unit 1008, and finishes using the finisher 1004. In outputting the image, the size and number of copies of paper sheets to be supplied, color/monochrome designation of the toner image to be formed, presence/absence of stapling performed by the finisher 1004, and the like are values set by the setting item descriptor 102D.

(2-8) Operation Monitoring Unit 108

The operation monitoring unit 108 determines whether the operation input time point indicated by the key code and the hierarchical value output from the GUI controller 104 is appropriate as a timing for obtaining a reference face. If appropriate, a signal level of output signals is set to be High, and positive logic is output. If the operation input time point indicated by the key code and the hierarchical value is inappropriate as a timing for obtaining a reference face, a signal level of output signals is set to be Low, and negative logic is output.

(2-9) Image Processor 109

The image processor 109 converts the frame image captured by the camera 1005 into a facial image using, as a base point, the input time point of a specific operation that does not cause delay based on determination made by the user, and obtains a reference face and a face to be determined. Here, the face to be determined is an expressive face expressing a facial expression of some kind, which is a face to be subject to emotion estimation. Meanwhile, the reference face indicates an emotionally neutral facial image to be a reference for a facial expression change. The image processor 109 estimates the emotion of the user using those reference face and face to be determined.

(2-10) On-Demand Help Unit 110

The on-demand help unit 110 causes the touch panel display 1001 to display a help image corresponding to the hierarchical value indicating the hierarchy of the screen to be operated.

[3] Internal Configuration of Operation Monitoring Unit 108

Figure 3:
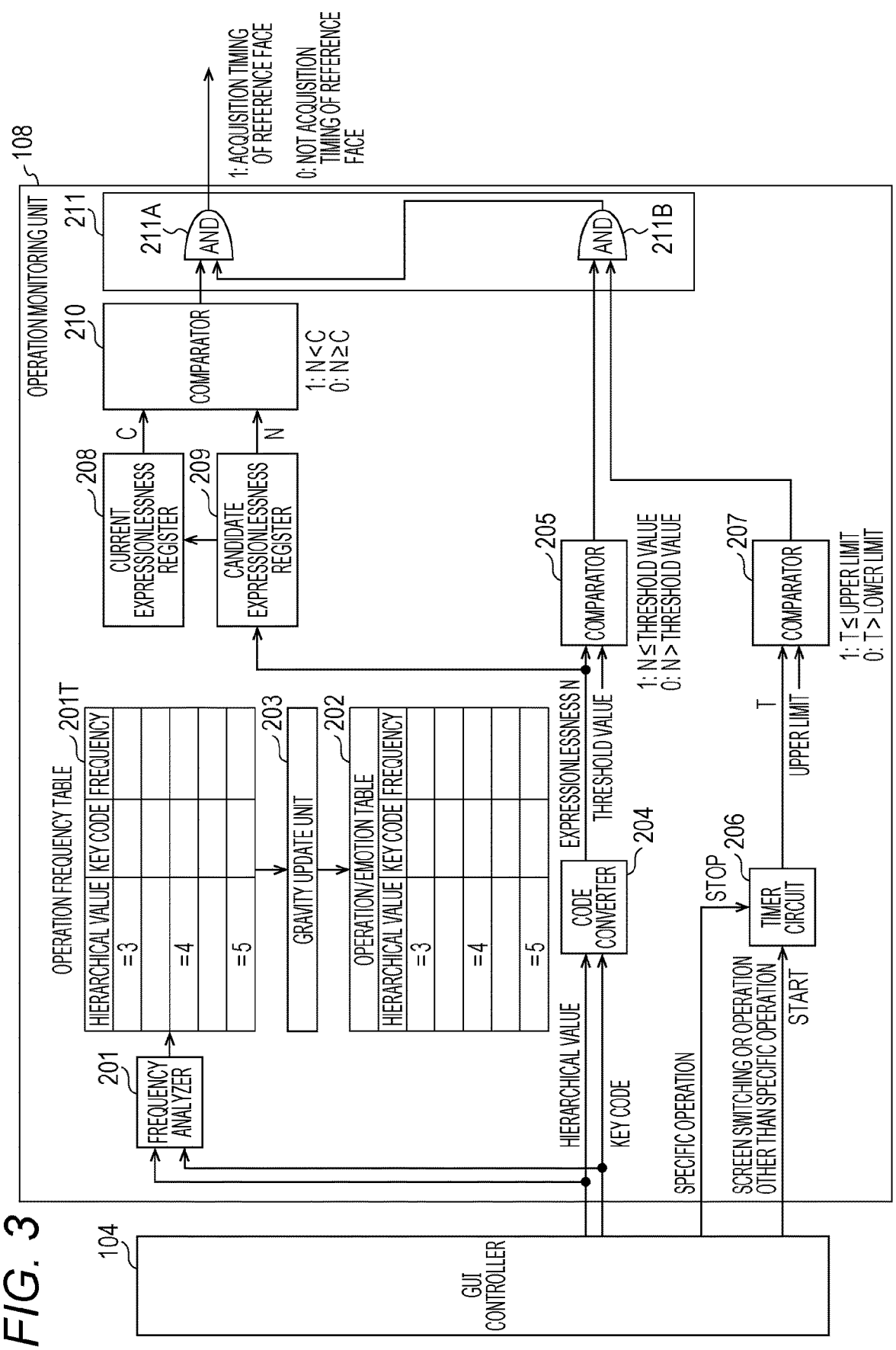
FIG. 3 illustrates an internal configuration of an operation monitoring unit according to one or more embodiments.

FIG. 3 illustrates an internal configuration of the operation monitoring unit 108. As illustrated in FIG. 3, the operation monitoring unit 108 includes a frequency analyzer 201, an operation frequency table 201T in the memory, an operation/emotion table 202 in the memory, a gravity update unit 203, a code converter 204, a comparator 205, a timer circuit (or a counter) 206, a comparator 207, a current expressionlessness register 208, a candidate expressionlessness register 209, a comparator 210, and determination logic 211 (AND circuits 211A and 211B).

(3-1) Frequency Analyzer 201

Each time the GUI controller 104 receives operation made on the printing condition setting item 100s, the frequency analyzer 201 receives a key code and a hierarchical value of the operated screen, and increments the number of operations for each operation in the operation frequency table 201T according to the operation. Then, the increment of the number of operations per unit time is calculated, whereby the operational frequency on the touch panel display 1001 is calculated.

(3-2) Operation/Emotion Table 202

The operation/emotion table 202 is an association table for associating operation performed by the user with a facial expression of the user when a printing condition is set, which shows a specific setting item (represented by a set of a hierarchical value and a key code) that does not cause delay based on determination made by the user in association with a degree of being expressionless in the hierarchical structure of the screen of the touch panel display 1001. The degree of being expressionless in the operation/emotion table 202 takes a value from 0.01 to 0.99. By such weighting for the setting item, the operation/emotion table 202 shows the association between operation for the specific setting item and a change in the facial expression of the user.

(3-3) Gravity Update Unit 203

The gravity update unit 203 updates the degree of being expressionless indicated in the operation/emotion table 202 on the basis of the frequency of the setting item indicated in the operation frequency table 201T and the hierarchical value of the screen to which the setting item belongs. In the operation/emotion table 202, a value corresponding to the hierarchical value of the screen to which the setting item belongs is set as a default value, and this default degree of being expressionless dynamically decreases or increases according to the operation frequency of the setting item.

Operation performed at high frequency is considered to be familiar to the user, and it is unlikely that the operation causes delay based on determination made by the user and a change in the facial expression of the user. On the other hand, it is highly likely that the user is confused to make determination with the screen when attending to operation performed at low frequency. In view of the above, the gravity update unit 203 expresses the correlation between the operation and the facial expression as a weighting factor by providing a level difference in the degree of being expressionless according to the operation frequency while setting a value corresponding to the hierarchical value as a default value.

(3-4) Code Converter 204

When the user performs operation on any of the setting items displayed on the touch panel display 1001, the code converter 204 converts the hierarchical value indicating the hierarchy of the screen output from the GUI controller 104 and the key code of the softkey operated by the user into a degree of being expressionless. This conversion is performed by reading, from the operation/emotion table 202, the degree of being expressionless associated with the combination of the key code and the hierarchical value output from the GUI controller 104 and outputting it to the comparator 205.

(3-5) Comparator 205

The comparator 205 compares the degree of being expressionless output from the code converter 204 with a threshold value, and in a case where the degree of being expressionless is equal to or less than the threshold value, sets the signal level of the output signals to be High, and outputs positive logic. On the other hand, in a case where the degree of being expressionless output from the code converter 204 exceeds the threshold value, the signal level of the output signals is set to be Low, and negative logic is output. In one or more embodiments, a relatively low threshold value (e.g., 0.1) is set to detect a mixed facial expression of sorrow and antipathy or a mixed facial expression of happiness and antipathy as a confused facial expression.

(3-6) Timer Circuit 206

The timer circuit 206 starts counting according to screen switching operation or operation related to a setting item other than a specific setting item, and stops the counting according to operation related to the specific setting item to output the count value up to that time to the comparator 207. In addition, in the timer circuit 206, a time-out time of a suitable time length (e.g., 5 minutes) is set as a reference of whether the user is confused. In a case where the timer circuit 206 continues the counting and the count value of the timer circuit 206 reaches the time-out time without the counting being stopped by the input of the specific setting item, the timer circuit 206 times out. With the timing of such time-out being notified to the image processor 109, the image processor 109 is caused to execute emotion estimation triggered by the time-out of the timer circuit 206.

(3-7) Comparator 207

The comparator 207 compares the count value of the timer circuit 206 with an upper limit value, and in a case where a count value T is equal to or less than the upper limit value, sets the signal level of the output signals to be High, and output positive logic. On the other hand, in a case where the count value T exceeds the upper limit value, the signal level of the output signals is set to be Low, and negative logic is output. The upper limit value of the comparator 207 is set to be a residence time in the case where input operation of a setting item is accompanied by some kind of doubt in determination and the operation delays. As will be described in detail later, it is said that a time interval of operation input is approximately 2 seconds when a general user smoothly performs input operation with a favorable tempo. In one or more embodiments, a residence time equal to or more than this time interval (e.g., range from 2 to 8 seconds) is adopted as an upper limit value set in the comparator 207.

(3-8) Current Expressionlessness Register 208

The current expressionlessness register 208 retains the current degree of being expressionless.

(3-9) Candidate Expressionlessness Register 209

The candidate expressionlessness register 209 retains the degree of being expressionless output from a table holding unit.

(3-10) Comparator 210

The comparator 210 carries out a size comparison to determine whether the degree of being expressionless retained in the candidate expressionlessness register 209 is lower than the current degree of being expressionless retained in the current expressionlessness register 208. In a case where the degree of being expressionless retained in the candidate expressionlessness register 209 is lower than the current degree of being expressionless, the signal level of the output signals is set to be High, and positive logic is output. On the other hand, in a case where the degree of being expressionless retained in the candidate expressionlessness register 209 is equal to or higher than the current degree of being expressionless, the signal level of the output signals is set to be Low, and negative logic is output.

(3-11) Determination Logic 211

The determination logic 211 includes the AND circuits 211A and 211B, and outputs positive logic in a case where the count value T of the timer circuit 206 is equal to or less than the upper limit value (output of the comparator 207 is positive logic), and the degree of being expressionless output from the code converter 204 is equal to or less than a threshold value (output of the comparator 205 is positive logic) and also lower than an existing current degree of being expressionless C (output of the comparator 210 is positive logic). The output of the positive logic by the determination logic 211 is to be the output of the positive logic of the operation monitoring unit 108.

Negative logic is output in a case where the count value T of the timer circuit 206 exceeds the upper limit value (output of the comparator 207 is negative logic), and the degree of being expressionless output from the code converter 204 exceeds the threshold value (output of the comparator 205 is negative logic) or equal to or higher than the existing current degree of being expressionless C (output of the comparator 210 is negative logic). The output of the negative logic by the determination logic 211 is to be the output of the negative logic of the operation monitoring unit 108.

[4] Image Processor 109

Figure 4:
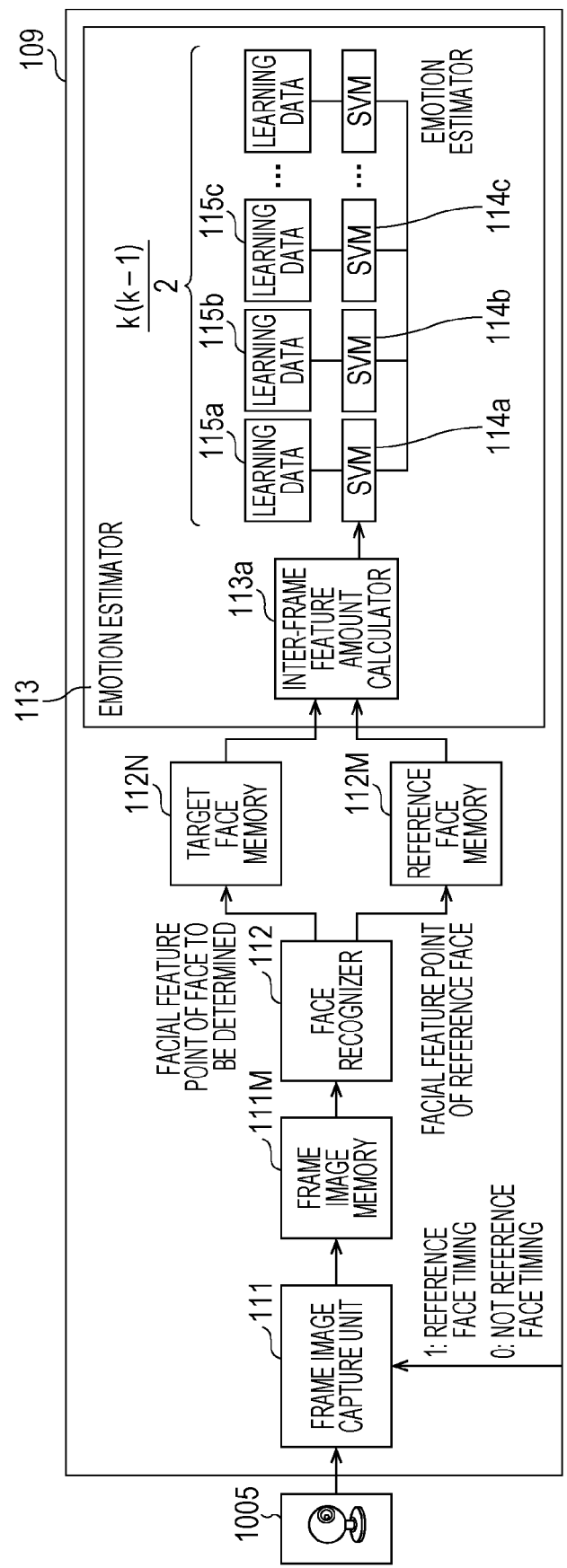
FIG. 4 is a block diagram illustrating an internal configuration of an image processor according to one or more embodiments.

FIG. 4 is a block diagram illustrating an internal configuration of the image processor 109. As illustrated in the present drawing, the image processor 109 includes a frame image capture unit 111, a frame image memory 111M, a face recognizer 112, a reference face memory 112M, a target face memory 112N, and an emotion estimator 113 (inter-frame feature amount calculator 113a, and SVMs 114a, b, c, etc.).

(4-1) Frame Image Capture Unit 111

The frame image capture unit 111 writes a frame image captured by the camera 1005 attached to the upper part of the multifunction peripheral (MFP) in the frame image memory 111M.

(4-2) Face Recognizer 112

When the output of the operation monitoring unit 108 has become positive logic, the face recognizer 112 obtains, using a time point at which the output of the operation monitoring unit 108 changes from negative logic to positive logic as a base point, a reference face from a frame image having a time code after the base point. In addition, in a case where the timer circuit 206 of the operation monitoring unit 108 times out or in a case where a degree of being expressionless of a specific setting item exceeds a threshold value, a face to be determined is obtained from, using the time point of the time-out or the time point at which the degree of being expressionless exceeds the threshold value as a base point, a frame image having a time code after the base point.

After the face to be determined is obtained, 24 facial feature points to be clues for estimating a facial expression from the frame image captured by the frame image capture unit 111 are obtained from the upper face, the center of the face, and the lower face of the reference face and the face to be determined. With regard to the reference face, 24 facial feature points are extracted from the upper face, the center of the face, and the lower face of the reference face, and information indicating the facial feature points is written in the reference face memory 112M as reference face information. With regard to the face to be determined as well, 24 facial feature points are extracted from the upper face, the center of the face, and the lower face of the face to be determined, and information associated with the facial feature points is written in the target face memory 112N as information associated with the face to be determined.

(4-3) Emotion Estimator 113

The emotion estimator 113 includes the inter-frame feature amount calculator 113a, and support vector machines (SVMs) 114a, b, c, and so on, which calculates, from the reference face and the face to be determined, an inter-frame feature amount that is a change amount of a facial expression change, and determines which of k types of emotions defined in an emotion model corresponds to the inter-frame feature amount calculated by the face recognizer 112.

(4-3-1) Inter-Frame Feature Amount Calculator 113a

The inter-frame feature amount calculator 113a obtains an inter-frame feature amount that characterizes a facial expression of the user from a positional relationship between a group of feature points in the upper face, the center of the face, and the lower face extracted from the reference face and a group of feature points in the upper face, the center of the face, and the lower face extracted from the face to be determined. Examples of the inter-frame feature amount obtained from the positional relationship mentioned above include a linear feature and a triangle feature.

(4-3-2) SVMs 114a, b, c, etc.

The SVMs 114a, b, c, and so on include a support vector machine (SVM) that is k(k−1)/2 discriminators. Here, k(k−1)/2 is the number of combinations ($_kC_2$) when any two of the k types of emotions defined in the emotion model are selected, which covers all combinations when any two of the k types of emotions are selected. The emotion model of one or more embodiments represents seven types of emotions, such as no facial expression, happiness, surprise, fear, antipathy, anger, and sorrow.

Learning data 115a, b, c, and so on learned using a training set are assigned to the SVMs 114a, b, c, and so on, and among the k(k−1)/2 emotion combinations, any one of the combinations (this combination is referred to as emotions $e_i$ and $e_j$) is determined. Then, the emotion estimator 113 outputs a code (emotion code) indicating, among the k types of emotions, an emotion having the most votes and an emotion having the second most votes by the SVMs 114a, b, c, and so on.

[5] Operation of Image Forming Apparatus

Operation of the image forming apparatus 1000 configured as described above will be described.

(5-1) Screen Hierarchical Structure

Figure 5:
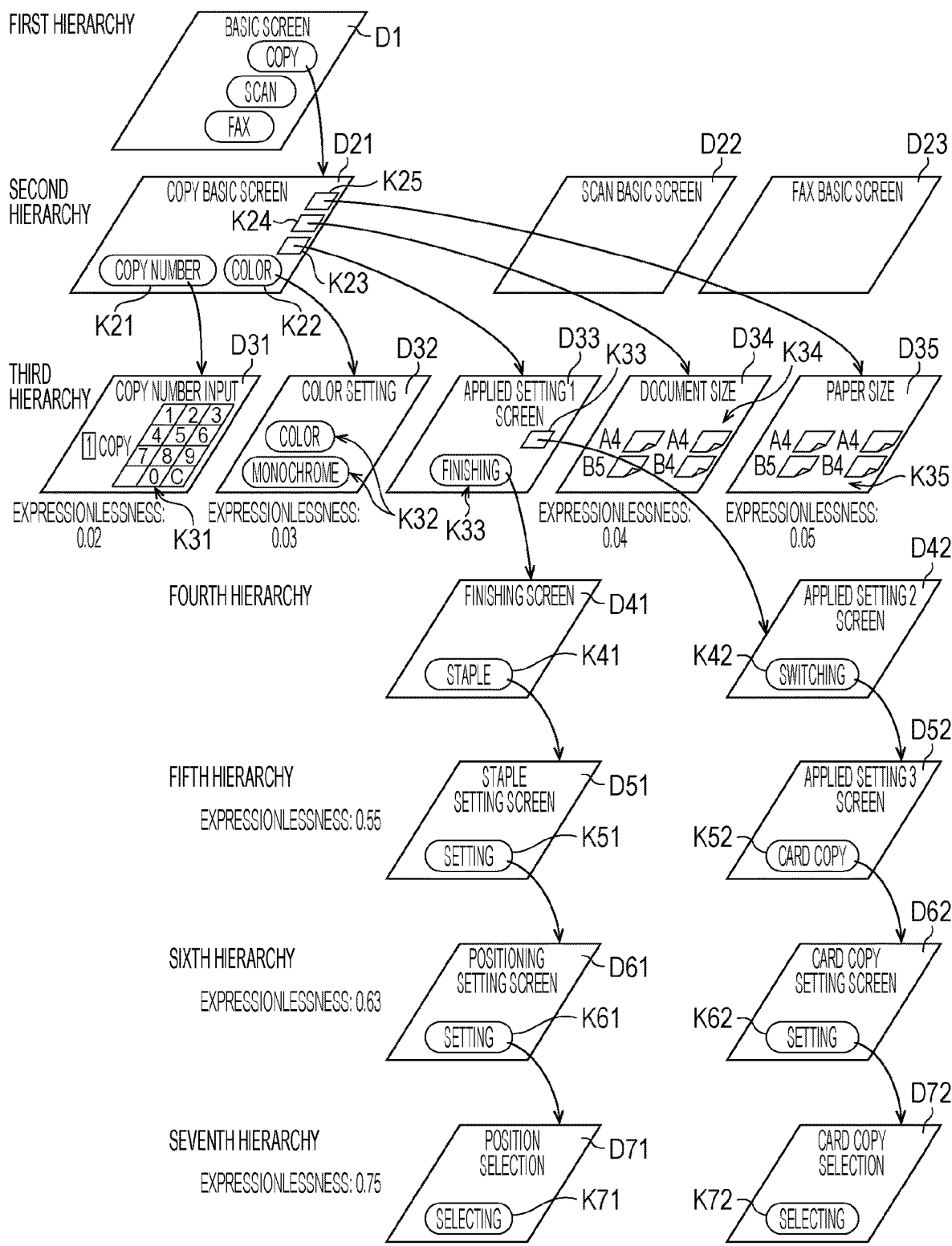
FIG. 5 illustrates a hierarchical structure of a screen displayed on a touch panel display according to one or more embodiments.

Screens to be displayed on the touch panel display 1001 have a hierarchical structure as illustrated in FIG. 5. In the hierarchical structure of FIG. 5, the first hierarchy is a hierarchy of a basic screen D1 that integrates functions such as copy, scan, and fax.

The second hierarchy is a hierarchy in which a copy basic screen D21, a scan basic screen D22, and a fax basic screen D23 exist.

The third hierarchy is a hierarchy in which setting screens, which are to be displayed by switching based on one action from the copy basic screen D21, exist. Examples of such setting screens include a copy number input screen D31 including a copy number input key K31, a color mode setting screen D32 including a color mode setting key K32, an applied setting 1 screen D33 including a finishing input key K33, a document size setting screen D34 including a document size input key K34, and a paper size setting screen D35 including a paper size input key K35.

The fourth hierarchy is a hierarchy in which setting screens, which are to be displayed by switching based on two actions from the copy basic screen D21, exist. Examples of such setting screens include a finishing screen D41 including a staple key K41, and an applied setting 2 screen D42 including a switching key K42.

The fifth hierarchy is a hierarchy in which setting screens, which are to be displayed by switching based on three actions from the copy basic screen D21, exist. Examples of such setting screens include a staple setting screen D51 including a setting key K51, and an applied setting 3 screen D52 including a card copy key K52.

The sixth hierarchy is a hierarchy in which setting screens, which are to be displayed by switching based on four actions from the copy basic screen D21, exist. Examples of such setting screens include a positioning setting screen D61 including a setting key K61, and a card copy setting screen D62 including a setting key K62.

The seventh hierarchy is a hierarchy in which setting screens, which are to be displayed by switching based on five actions from the copy basic screen D21, exist. Examples of such setting screens include a position selection screen D71 including a selection key K71, and a card copy selection screen D72 including a selection key K72.

In the operation/emotion table 202, setting items of third or lower hierarchies in the hierarchical structure are set as specific setting items, and are subject to weighting. The degree of being expressionless is to be a value corresponding to the hierarchical value of the screen on which the softkey is displayed. That is, as the hierarchy to which the softkey belongs is deeper and the number of hierarchical values of the setting item is larger, the value of the degree of being expressionless is larger (0.55, 0.63, and 0.75 in the drawing).

(5-2) Dynamic Setting of Expressionlessness

Figure 6:
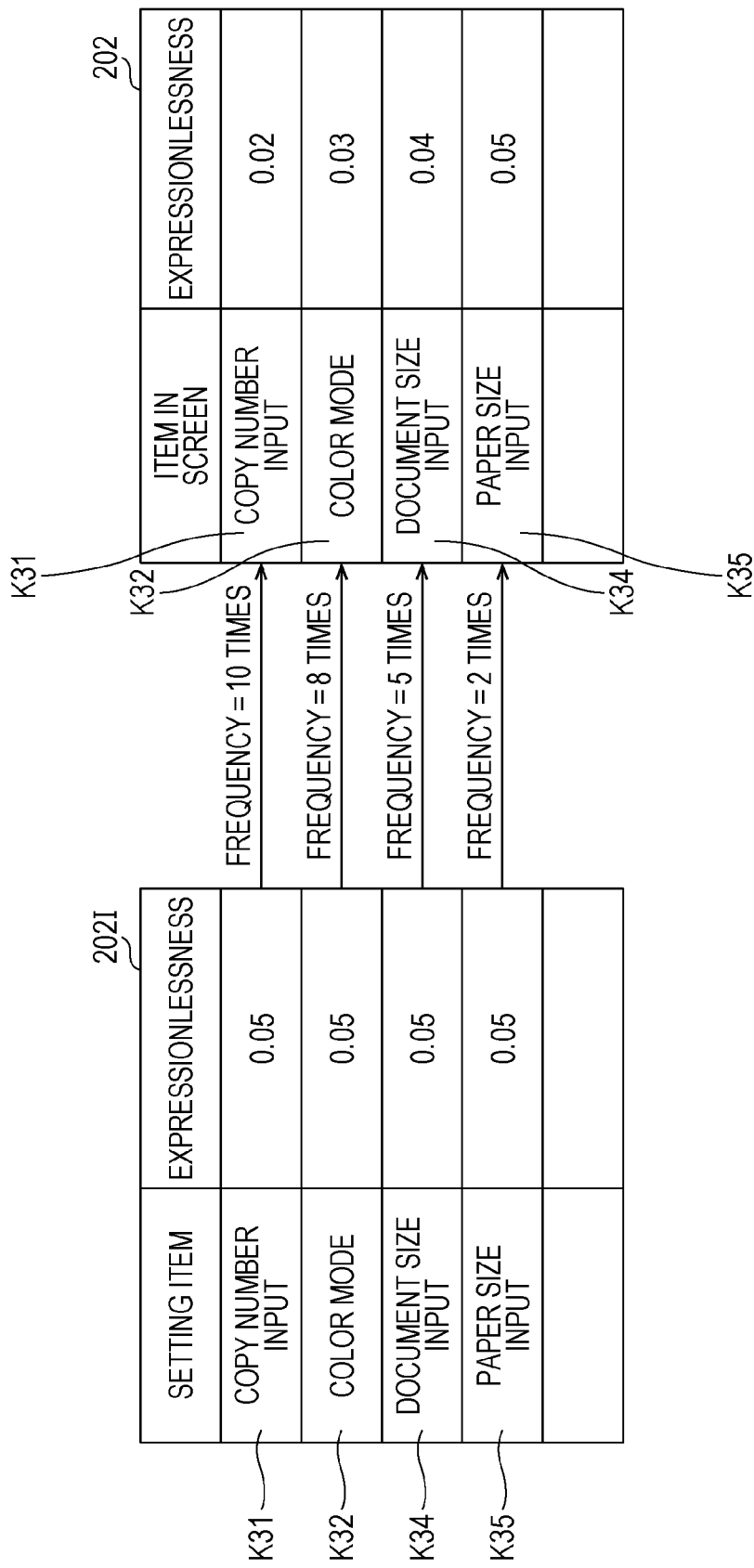
FIG. 6 illustrates a dynamic update of an operation/emotion table according to one or more embodiments.

The frequency analyzer 201 and the gravity update unit 203 execute a dynamic update of the operation/emotion table 202 as preprocessing of emotion estimation. FIG. 6 illustrates a dynamic update of the operation/emotion table 202.

The operation/emotion table 202 is assumed to be set as illustrated in an operation/emotion table 2021 on the left side of FIG. 6.

The operation/emotion table 2021 is an initial state of the operation/emotion table 202, which specifies each key code and hierarchical value of the copy number input key K31, the color mode setting key K32, the document size input key K34, and the paper size input key K35 in the third hierarchy as a key to be associated with a change in facial expression of the user, and weights the key codes of those keys with a common default value (0.05) corresponding to the hierarchical structure of FIG. 5.

Thereafter, it is assumed that operation of the copy number input key K31, operation of the color mode setting key K32, operation of the document size input key K34, and operation of the paper size input key K35 are continuously performed and frequencies of those keys are different values (10 times, 8 times, 5 times, and 2 times in the drawing).

According to such frequencies, the gravity update unit 203 updates the degree of being expressionless of the operation associated with the facial expression of the user in the operation/emotion table 202. As a result, the degree of being expressionless shown in the operation/emotion table 202 has level differences (0.02 for copy number input key K31, 0.03 for color mode setting key K32, 0.04 for document size input key K34, and 0.05 for paper size input key K35).

(5-3) Main Routine Process

It is assumed that, after the operation/emotion table 202 is updated in this manner, the user requests the image forming apparatus 1000 to execute a print job. In response to the request for the print job, the image forming apparatus 1000 executes processing procedures illustrated in flowcharts of FIGS. 7, 8, and 10.

Figure 7:
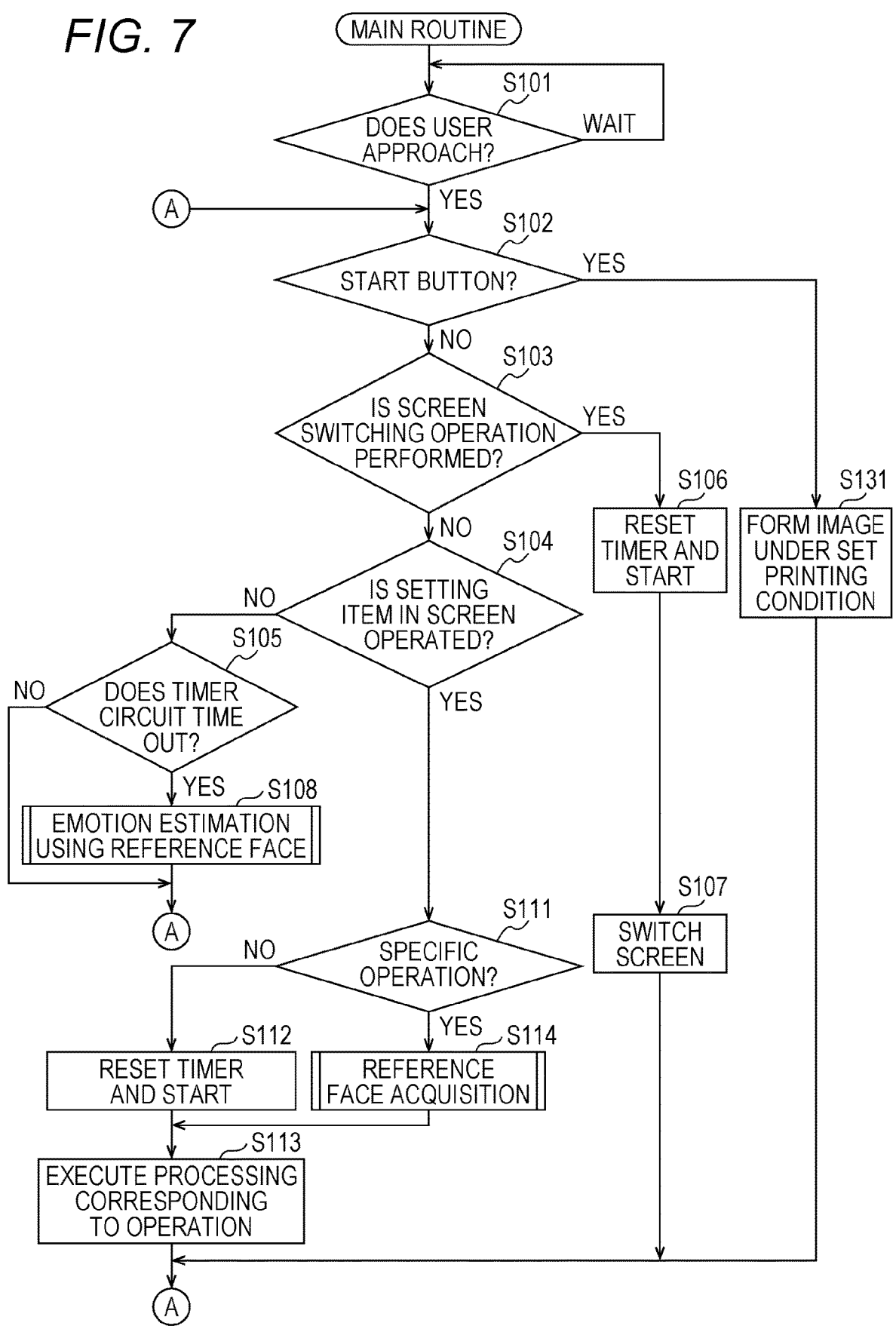
FIG. 7 is a flowchart illustrating a main routine of a processing procedure of the image forming apparatus according to one or more embodiments.

FIG. 7 is a main routine of those flowcharts. When the process of the main routine in FIG. 7 starts, it stands by for determination as to whether the user has approached (step S101), and when the user approaches, the process proceeds to a loop including steps S102 to S105. This loop is for determining whether a start button is pressed (step S102), whether operation for switching a screen of the touch panel display 1001 is performed (step S103), whether a setting item in the screen is operated (step S104), and whether the timer circuit 206 has timed out (step S105).

When the screen switching operation is performed (Yes in step S103), the timer circuit 206 is reset, and counting starts (step S106). Subsequently, the screen switching is executed in accordance with the operation performed by the user (step S107).

When the setting item is operated (Yes in step S104), it is determined whether the user operation is a specific operation, that is, whether the operated setting item is a specific setting item associated with a facial expression of the user (step S111). If it is not the specific setting item (No in step S111), the timer circuit 206 is reset, and counting starts (step S112). Subsequently, processing corresponding to the operation performed by the user is executed (step S113). If it is the specific operation (Yes in step S111), a reference face is obtained (step S114).

(5-4) Reference Face Acquisition

Figure 8:
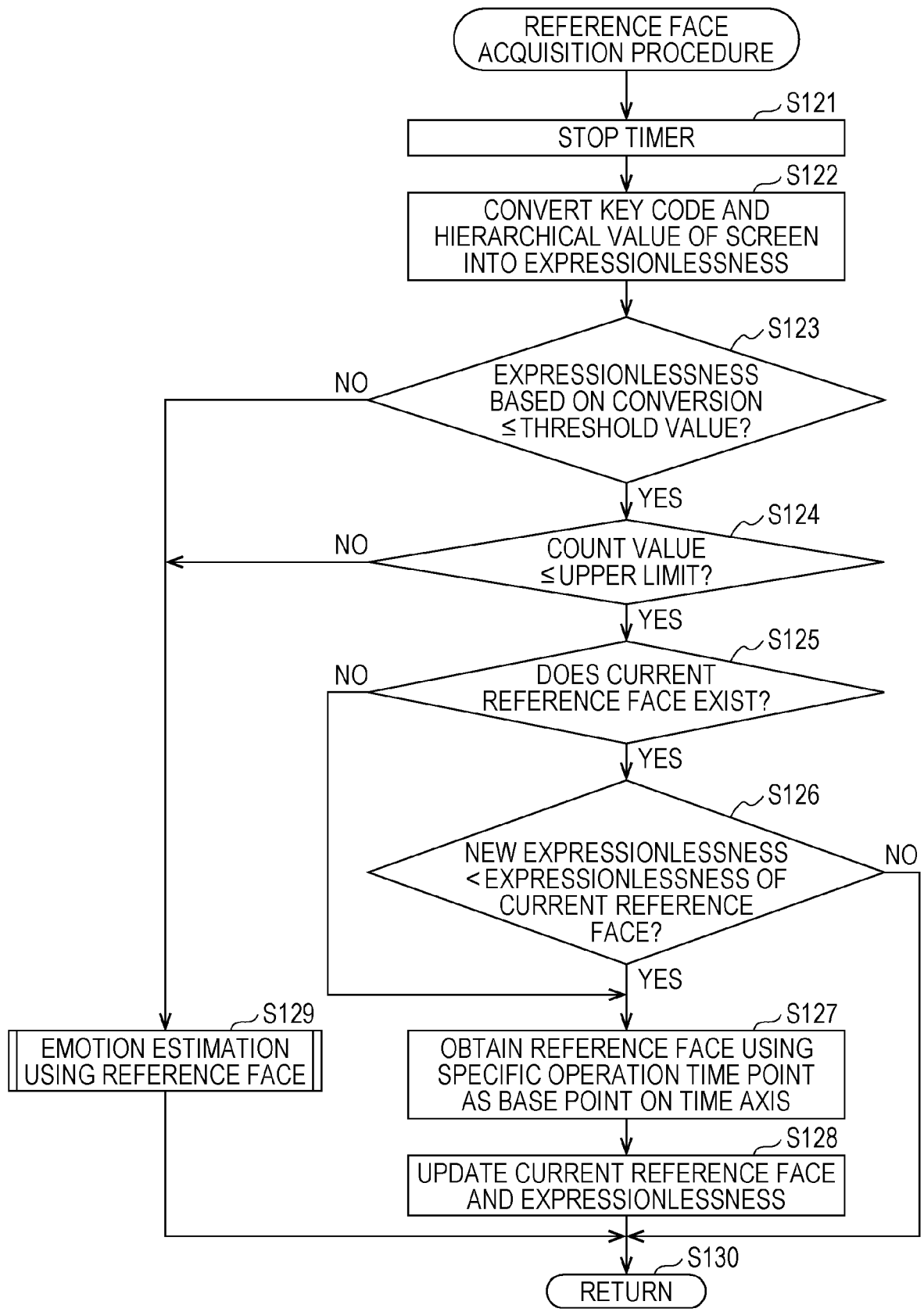
FIG. 8 is a flowchart illustrating details of a procedure for obtaining a reference face according to one or more embodiments.

The procedure for obtaining the reference face in step S114 can be expanded into a subroutine of FIG. 8. FIG. 8 is a flowchart illustrating details of the procedure for obtaining a reference face.

First, the counting performed by the timer circuit 206 is stopped (step S121), and the code converter 204 is caused to convert the key code and the hierarchical value of the displayed screen into a degree of being expressionless (step S122).

Subsequently, a series of determination steps S123 to S126 is executed. Step S123 is for determination as to whether the degree of being expressionless obtained by the conversion of the hierarchical value and the key code is equal to or less than a threshold value, and step S124 is for determination as to whether the count value of the timer circuit 206 is equal to or less than the upper limit value. If the degree of being expressionless for a new key code is equal to or less than the threshold value and the count value of the timer circuit 206 is equal to or less than the upper limit value, it indicates Yes in step S123 and Yes in S124, and the process proceeds to step S125. Step S125 is for determination as to whether the current reference face exists, and step S126 is for determination as to whether a degree of being expressionless v of the new operation is lower than a current degree of being expressionless u of the current reference face.

If the current reference face does not exist, it indicates No in step S125, and a reference face is obtained using, as a base point, an input time point at which the input operation of the specific setting item is performed without executing the determination in step S126 (step S127).

A detailed process of the reference face acquisition is as follows. The frame image capture unit 111 separates a facial image from, among the frame images captured by the camera 1005, the frame images having a time code after the base point. Specifically, the face recognizer 112 extracts a face outline from the frame image.

With the outline being used as a boundary, parts other than the face (background, part below the neck) in the frame image are separated. With such separation being performed, a facial image representing the reference face is obtained, and the face recognizer 112 extracts facial feature points.

If the facial feature points of the reference face are extracted through the process described above, information associated with the facial feature points of the reference face is written in the reference face memory 112M while the degree of being expressionless of the specific operation is written in the current expressionlessness register 208 (step S128), and the process returns to the main routine from which the process is derived (step S130).

If the current reference face exists and the degree of being expressionless v for the newly performed specific operation is equal to or higher than the degree of being expressionless of the current reference face (No in step S126), the process returns to the main routine from which the process is derived without the reference face being written (step S130).

(5-5) Reference Face Update

Figure 9:
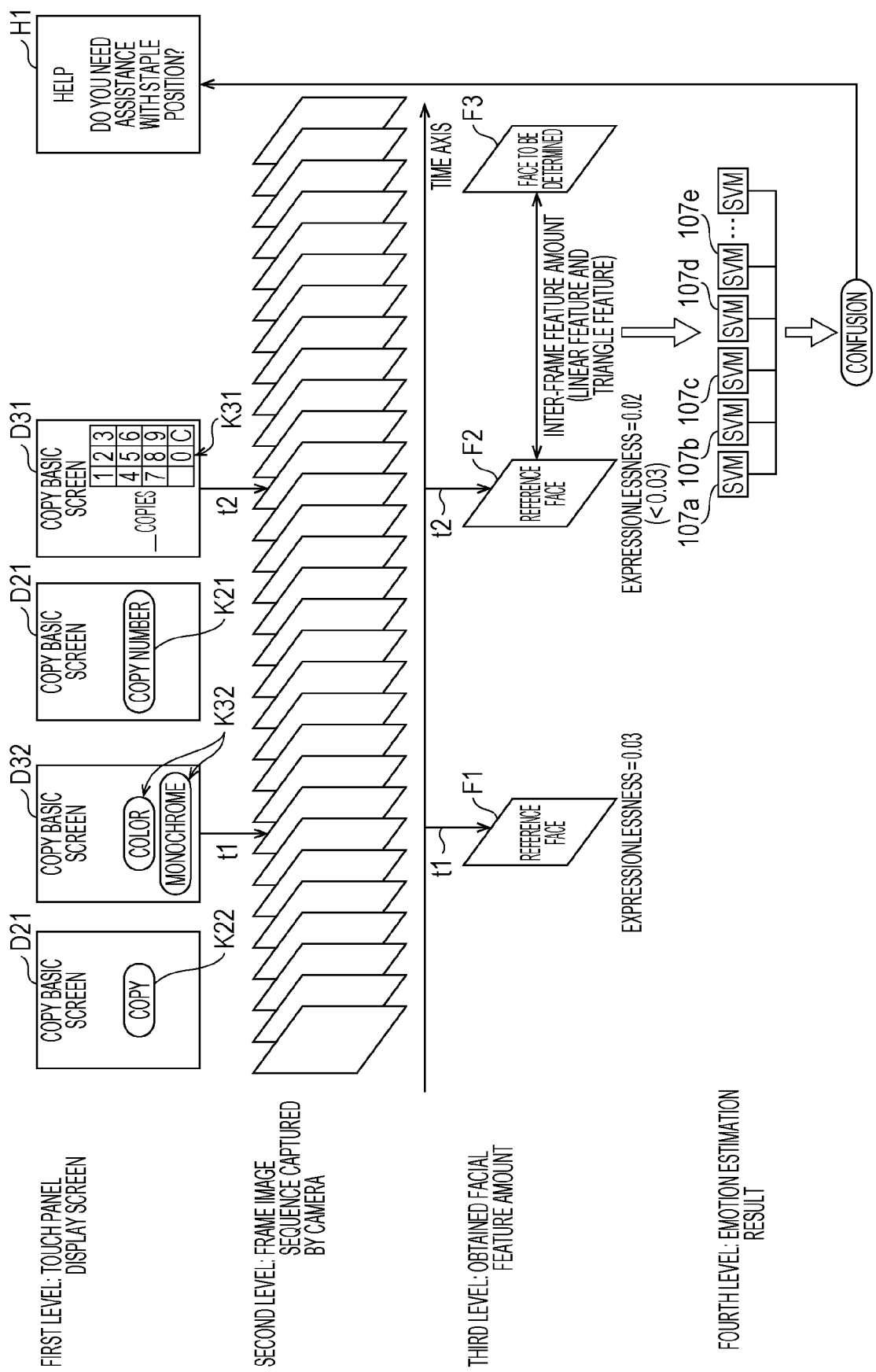
FIG. 9 is a timing chart illustrating a series of flow starting from acquisition of a reference face, which is followed by acquisition of a face to be determined, and estimation of an emotion according to one or more embodiments.

FIG. 9 is a timing chart illustrating a series of flow starting from acquisition of a reference face, which is followed by acquisition of a face to be determined, and emotion estimation. The first level illustrates screen transition of the touch panel display 1001, and the second level illustrates a sequence of frame images captured by the camera 1005. The third level illustrates a face to be determined and a reference face obtained from the frame image, and the fourth level illustrates an emotion estimation process.

It is assumed that the color mode on the copy basic screen D21 is pressed and the color mode setting key K32 is displayed. Since the color mode setting key K32 is a key specified as an object to be linked in the operation/emotion table 202, when the softkey is pressed, the degree of being expressionless of 0.03 associated with the key code of the softkey is compared with the threshold value of "0.1", and is determined to be equal to or less than the threshold value (step S123). As a result, a reference face F1 is obtained using, as a base point on the time axis, an input time point t1 at which the input operation of the color mode setting key K32 is performed on the time axis of the second level (step S127).

It is assumed that, subsequently, a copy number key K21 on the copy basic screen D21 is pressed and the copy number input key K31 in the form of a numerical pad is displayed. Since the copy number input key K31 is a key associated with a facial expression of the user in the operation/emotion table 202, when the copy number input key K31 is touched, a reference face F2 is obtained from, using an input time point t2 at which the input operation of the copy number input key K31 is performed as a base point on the time axis, the frame image having a time code after the base point.

As the two reference faces have been obtained in this manner, a size comparison of the degree of being expressionless is carried out between the previously obtained reference face F1 and the current reference face F2 (step S126).

Since the degree of being expressionless of "0.02" for weighting the copy number input key K31 is lower than the degree of being expressionless "0.03" of the color mode setting key K32 stored in the current expressionlessness register 208 (Yes in step S126), the output of the comparator 210 is positive logic. As a result, the degree of being expressionless of the current expressionlessness register 208 is overwritten with "0.02" (step S128).

(5-6) Emotion Estimation

If the degree of being expressionless obtained by the conversion of the code converter 204 exceeds the threshold value (No in step S123), emotion estimation using the reference face is executed (step S129). In a similar manner to the above, if the count value of the timer circuit 206 exceeds the upper limit (No in step S124) although the degree of being expressionless obtained by the conversion of the code converter 204 is equal to or lower than the threshold value (Yes in step S123), emotion estimation using the reference face is executed (step S129).

If the timer circuit 206 has timed out with the user performing no operation, it also indicates Yes in step S105 of FIG. 7, and emotion estimation using the reference face is executed (step S108).

Figure 10:
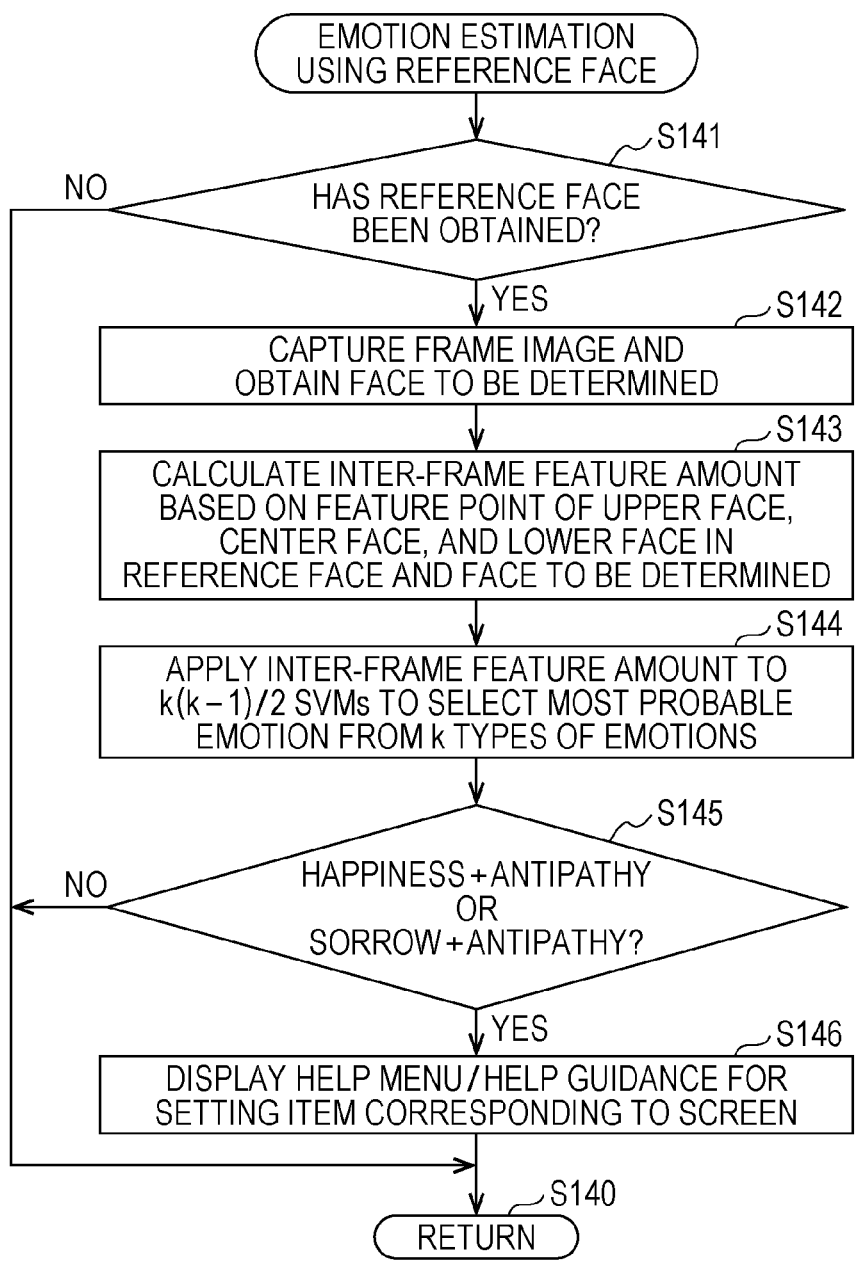
FIG. 10 is a flowchart illustrating details of a procedure for estimating an emotion using a reference face according to one or more embodiments.

The procedure of steps S129 and S108 can be expanded into a subroutine of FIG. 10. FIG. 10 is a flowchart illustrating details of the emotion estimation procedure using a reference face. It is determined whether the reference face has been obtained (step S141), and if the reference face has not been obtained (No in step S141), the process returns to the flowchart from which the process is derived (step S140) without performing any processing. If the reference face has been obtained (Yes in step S141), the frame image capture unit 111 is caused to capture the frame image, and the face recognizer 112 is caused to obtain the face to be determined and to obtain facial feature points (step S142).

Since a posture of the user changes every moment, it is highly likely that the position and size of the face in the frame image differ between the acquisition timing of the reference face and the acquisition timing of the face to be determined. In view of the above, the face recognizer 112 performs affine transformation on the facial image of the face to be determined before extracting the facial feature points from the face to be determined so that the outlines of the eyes, nose, and lips of the reference face match with the outlines of the eyes, nose, and lips of the face to be determined.

Since the affine transformation involves positional movement of the facial feature points and scaling of the face, the reference face and the face to be determined positionally correspond to each other. After the reference face and the face to be determined are made to correspond to each other as described above, the face recognizer 112 searches for 24 facial feature points that characterize the face to be determined.

Figure 11:
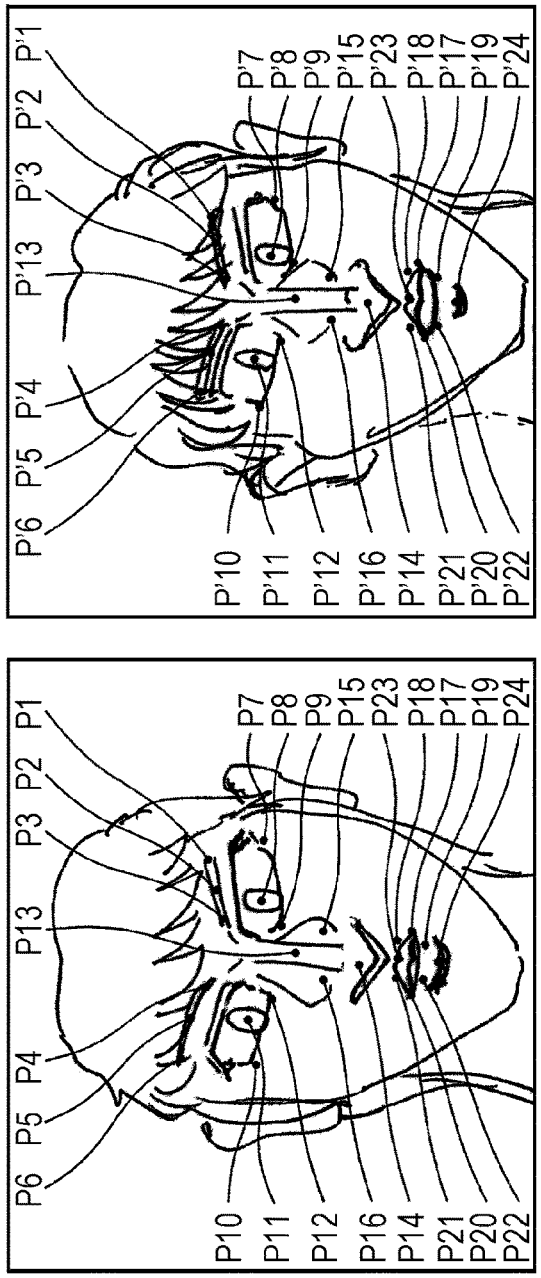
FIG. 11 illustrates 24 facial feature points extracted from a reference face and a face to be determined, a linear feature, and a triangle feature according to one or more embodiments.
Figure 11:
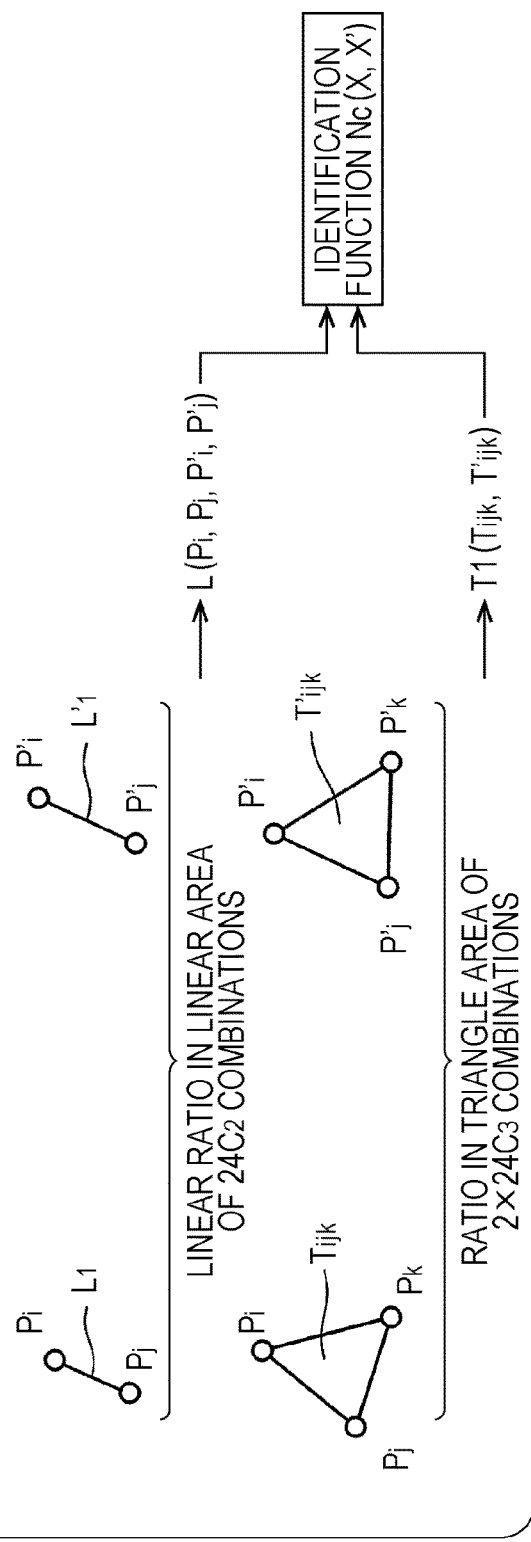

As a result of the search, 24 facial feature points P1 to P24 illustrated in FIG. 11 are assumed to be extracted from the reference face. Meanwhile, 24 facial feature points P'1 to P'24 illustrated in FIG. 11 are assumed to be extracted from the face to be determined.

When the facial feature points are extracted in this manner, an inter-frame feature amount (linear feature and triangle feature) is calculated on the basis of the feature points of the upper face, the center of the face, and the lower face of each of the reference face and the face to be determined (step S143). The inter-frame feature amount calculator 113a calculates the inter-frame feature amount for those facial feature points.

In FIG. 11, $L(P_i, P_j, P'_i, P'_j)$ indicates a ratio of the length between a straight line $L_1$ connecting any two facial feature points $P_i$ and $P_j$ in the reference face and a straight line $L'_1$ connecting any two facial feature points $P'_i$ and $P'_j$ in the face to be determined.

T1 $(T_{ijk}, T'_{ijk})$ indicates a triangle feature corresponding to a ratio between a triangular area $T_{ijk}$ whose vertices are any three facial feature points $P_i$, $P_j$, and $P_k$ in the reference face and a triangular area $T'_{ijk}$ whose vertices are any three facial feature points $P'_i$, $P'_j$, and $P'_k$ in the face to be determined.

There are three types of triangle features T1 $(T_{ijk}, T'_{ijk})$ including (1) a triangle feature based on a luminance average, (2) a triangle feature based on a luminance histogram, and (3) a triangle feature based on an area.

In calculating the (1) triangle feature based on a luminance average, the face recognizer 112 calculates an average value I of the pixel luminance in the triangular area $T_{ijk}$ in the reference face. At the same time, an average value I' of the pixel luminance in the triangular area $T'_{ijk}$ in the face to be determined is calculated. A ratio I'/I of those average values of the pixel luminance is obtained to be used as a triangle feature based on the average value.

In calculating the (2) triangle feature based on a luminance histogram, the face recognizer 112 creates a histogram of four gradations of pixel luminance for each of the triangular area $T_{ijk}$ in the reference face and the triangular area $T'_{ijk}$ in the face to be determined. In the four-gradation histogram of pixel luminance, with the i-th (i=1, 2, 3, or 4) gradation value of the reference face being set to $H_i$, the i-th, gradation value of the face to be determined being set to $H'_i$, the number of pixels included in the triangular area $T_{ijk}$ in the reference face being set to P, and the number of pixels included in the triangular area $T'_{ijk}$ in the face to be determined being set to P', a four-dimensional numerical vector having $(H'_i/P'-H_i/P)$ as elements is calculated to be used as a triangle feature based on the luminance histogram.

In calculating the (3) triangle feature based on an area, the face recognizer 112 uses a ratio between the area of the triangular area $T_{ijk}$ in the reference face and the area of the triangular area $T'_{ijk}$ in the face to be determined as a triangle feature based on the area ratio.

The inter-frame feature amount calculated in this manner is applied to the k(k−1)/2 SVMs 114a, b, c, d, and so on to select most probable two emotions from the k types of emotions defined in the emotion model (step S144).

The learning data 115a, b, c, and so on are training sets $\{x_1, x'_1, y_1\}$ to $\{x_n, x'_n, y_n\}$ generated through the learning process. Here, $x_1$ to $_n$ are a set of facial feature points obtained from a facial image determined to be expressionless, and $y_1$ to $_n$ represent one of the seven types of emotions in the emotion model. Further, $x'_1$ to $_n$ represent a set of facial feature points obtained from a facial image in which the facial expression indicated by $y_1$ to $_n$ is determined to appear.

The SVMs 114a, b, c, and so on apply, to the following equations (2) and (3) of a formula 1, the training sets $\{x_1, x'_1, y_1\}$ to $\{x_n, x'_n, y_n\}$ of the learning data, a reference face x, a face to be determined x', and a generated feature amount $f_i(x, x')$, thereby obtaining an average $\mu_{ci}$ of the feature amount $f_i$ and variance $\sigma^2_{ci}$ of the feature amount $f_i$. Note that $n_c$ in the equations (2) and (3) of the formula 1 represents the total number of cases expressing a facial expression c, and $I(y_k=c)$ is a function that returns positive logic when a facial expression $y_c$ of the case set is the facial expression c, and returns negative logic when the facial expression $y_c$ of the case set is no the facial expression c.

[Formula 1]

$$N_{ci}(x, x') = \frac{1}{\sqrt{2\pi}\,\sigma_{ci}} \exp\left\{-\frac{(f_i(x, x') - \mu_{ci})^2}{2\sigma^2_{ci}}\right\}. \quad (1)$$

$$\mu_{ci} = \frac{1}{n_c}\sum_{k=1}^{n}\{I(y_k = c)\cdot f_i(x_k, x'_k)\}, \quad (2)$$

$$\sigma^2_{ci} = \frac{1}{n_c - 1}\sum_{k=1}^{n}\{I(y_k = c)\cdot(\mu_{ci} - f_i(x_k, x'_k))^2\}. \quad (3)$$

Furthermore, the reference face x, the face to be determined x', the generated feature amount $f_i(x, x')$, the average $\mu_{ci}$ of the feature amount $f_i$, and the variance $\sigma^2_{ci}$ of the feature amount $f_i$ are applied to an identification function $N_c(x, x')$.

The equation (1) of the formula 1 represents an identification function $N_{ci}(x, x')$ for identifying a facial expression $C_i$ on the basis of the feature amount $f_i$ of the face to be determined and the reference face.

Note that the equations (1), (2), and (3) of the formula 1 are merely examples. In one or more embodiments, a different one may be used depending on a type of the inter-frame feature amount.

The training sets in the learning data 115a, b, c, and so on are generated using training examples to be described below.

1. Surprise

Among negative facial expressions, motions of respective parts of the face when surprise appears are as follows.

In the upper face, the eyebrows are curved and raised up.

At the center of the face, the upper eyelid is raised up and the lower eyelid is relaxed.

In the lower face, the jaw moves downward, and the mouth loosely opens so that teeth appear.

2. Fear Among negative facial expressions, motions of respective parts of the face when fear appears are as follows.

The upper face is raised up as a whole to make a horizontal wrinkle.

At the center of the face, the upper eyelid is raised up and the lower eyelid tenses.

In the lower face, the lips tense to open, or tense to close with the corner of the mouth being pulled backward.

3. Antipathy

Among negative facial expressions, motions of respective parts of the face when antipathy appears are as follows.

In the upper face, the eyebrows go downward.

At the center of the face, a degree of eye opening becomes narrower, and a recess and wrinkle appear under the eyes.

In the lower face, the upper lip is raised up, a wrinkle appears at the base position of the nose, and there are three patterns of motions of the lips including (1) the lower lip is raised up to be pushed out, (2) the lower lip goes downward to pout, and (3) one end of the lips is raised.

4. Anger

Among negative facial expressions, motions of respective parts of the face when anger appears are as follows.

In the upper face, the eyebrows go downward and are brought inward to make a wrinkle between the eyebrows.

At the center of the face, the upper eyelid goes downward, and the lower eyelid tenses.

There are two patterns of motions in the lower face including (1) the upper and lower lips are pressed and closed, and (2) the lips open as if shouting something.

5. Sorrow

Among negative facial expressions, motions of respective parts of the face when sorrow appears are as follows.

In the upper face, the inner ends of the eyebrows are raised up and drawn to each other.

At the center of the face, a triangular shape appears on both outer sides of the upper eyelid, and the lower eyelid is raised up.

In the lower face, both ends of the lips go downward.

6. Happiness

Among positive facial expressions, motions of respective parts of the face when happiness appears are as follows.

Although no noticeable change appears in the upper face, wrinkles appear under the eyes and at the corners of the eyes at the center of the face. In the lower face, there appears one of the patterns including (1) the lips are closed, (2) the lips are separated but while the teeth are not separated, and (3) the mouth opens and the teeth are separated, and in addition, both ends of the lips are pulled backward and raised up to form a characteristic wrinkle from the nose to both ends of the mouth.

Among the emotions specified by the changes in facial expression described in 1. to 6. above, the emotion having the most votes cast by the SVMs 114a, b, c, and so on, and the emotion having the second most votes cast are output as a facial expression that appears on the face to be determined. The SVMs 114a, b, c, and so on determine, as no facial expression, the face to be determined that does not correspond to any of the types 1. to 6. described above in which 24 facial feature points indicated by the linear feature and the triangle feature are the same.

After the emotion estimation is executed in this manner, it is determined whether the emotion to be the estimation result is a predetermined negative emotion (happiness+antipathy, or sorrow+antipathy) (step S145). If it is the negative emotion (Yes in step S145), the on-demand help unit 110 is caused to display a help screen (help menu and help guidance) based on the hierarchical value and the key code (step S146), and the process returns to the loop including the steps S102 to S105 (step S140). If the emotion estimation result is not the predetermined negative emotion, step S146 is skipped, and the process returns to steps S102 to S106 of FIG. 7 (step S140).

(5-7) Help Display

A staple positioning setting is assumed to be selected as one of printing conditions of a print job. In the staple positioning setting, the basic screen D1 is switched to the copy basic screen D21 in the hierarchical structure of FIG. 5, and then reaches the position selection screen D71 through the applied setting 1 screen D33, the finishing screen D41, the staple setting screen D51, and the positioning setting screen D61. The position selection key K71 on the position selection screen D71 receives selection of whether to target a corner of the sheet face or to make two holes.

In such a case of operation for a setting item after screen switching is performed a number of times, it is highly likely that the user is not in a calm psychological state while being confused by the operation or being upset with the operation not being clear to the user. In view of the above, assuming that the user is likely to be confused, the face to be determined is obtained to estimate the emotion using, as a trigger, time-out of the timer circuit 206 or operation for the setting items of the seventh hierarchy.

Accordingly, the staple position selection key K71 is specified as a specific operation, and is weighted by a relatively high hierarchical value (0.75) corresponding to the hierarchical value of 7 in the hierarchical structure. Since the hierarchical value is larger than the threshold value (No in step S123), the emotion estimation is carried out.

Figure 12:
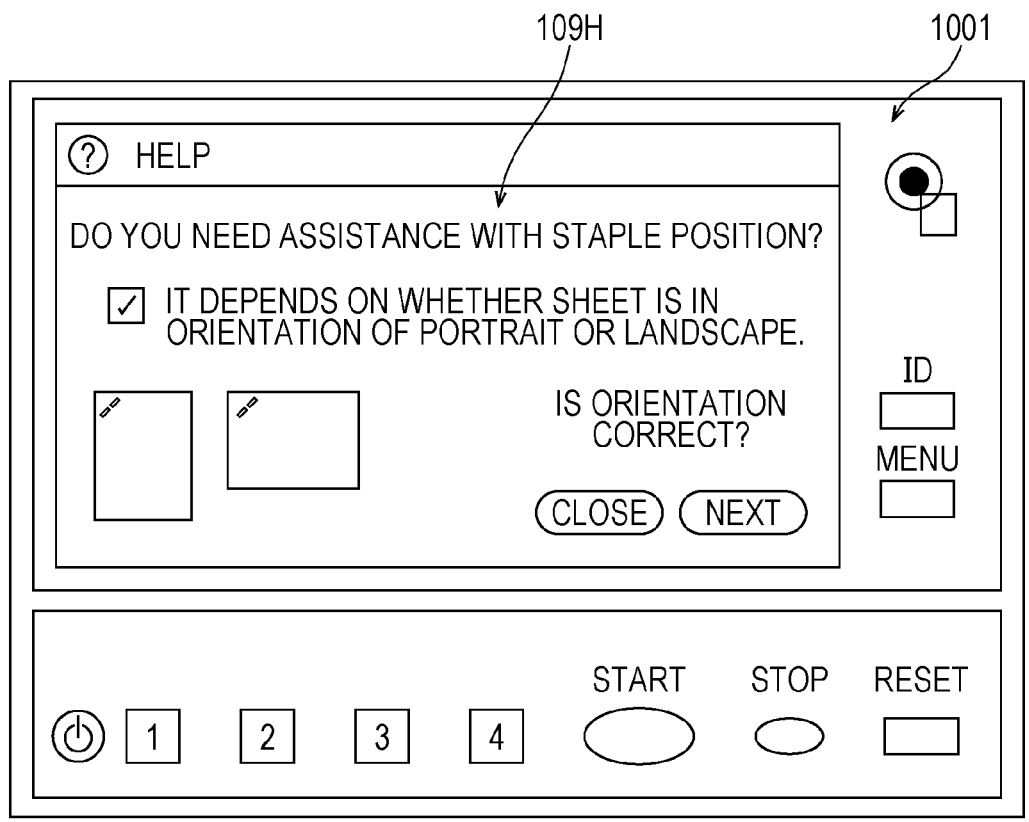
FIG. 12 illustrates a help screen corresponding to a staple position setting according to one or more embodiments.

If a large number of votes for sorrow and antipathy is cast by the SVMs 114*a, b, c, d*, and so on, or if a large number of votes for a combination of happiness and antipathy is cast, it is highly likely that the facial expression of the user is changed to confusion. In this case, it indicates Yes in step S145, and the process proceeds to step S146. In step S146, a help screen 109H corresponding to the staple position setting is displayed as illustrated in FIG. 12. This provides the user with appropriate advice.

A case of selecting a card copy function of the seventh hierarchy will be described. The card copy is one of application functions that transfers, at the time of copying business cards, licenses, and insurance cards, images on front and back surfaces of those business cards, licenses, and insurance cards onto a single sheet face of a paper sheet. At the time of performing card copy, the basic screen D1 is switched to the copy basic screen D21 in the hierarchical structure of FIG. 5, and then reaches the card copy selection screen D72 through the applied setting 1 screen D33, the applied setting 2 screen D42, the applied setting 3 screen D52, and the card copy setting screen D62. Since the card copy selection key K72 is reached after such multiple times of screen switching, it is highly likely that a calm state cannot be kept during the operation in a similar manner to the staple positioning described above. Accordingly, while the card copy selection key K72 is specified as a specific operation, it is weighted by a relatively high hierarchical value (0.75) corresponding to the hierarchical value of 7 in the hierarchical structure. Since the hierarchical value is larger than the threshold value (No in step S123), emotion estimation is carried out when the card copy selection key K72 is pressed.

In the emotion estimation, if a large number of votes for the combination of "sorrow" and "antipathy" is cast or a large number of votes for the combination of "happiness" and "antipathy" is cast by the SVMs 114*a, b, c*, and so on performing majority voting, the on-demand help unit 110 is caused to display a help screen for the card copy.

[6] Summary

When smoothly operating the touch panel display 1001 in the middle of the hierarchical structure, the user is not confused by the operation and remains in a calm emotion. In this manner, the operation with which the emotion is likely to be kept calm is specified as, using the operation/emotion table 202, an operation to be associated with a change in facial expression, and the reference face is obtained before and after the timing at which the operation is performed, whereby facial feature points indicating emotions such as anger and sorrow can be extracted highly accurately. With the emotion estimation being carried out using such an expressionless facial image as a reference, the accuracy of the emotion estimation can be improved.

In the above embodiments, a timing to obtain a reference face is specified by association between operation and a degree of being expressionless. Meanwhile, in one or more embodiments, the presence or absence of correlation between an operation and a change in facial expression of a user is determined on the basis of whether a time interval of operations counted by a timer circuit is equal to or less than the lower limit value.

[7] Configuration of Operation Monitoring Unit 108

Figure 13:
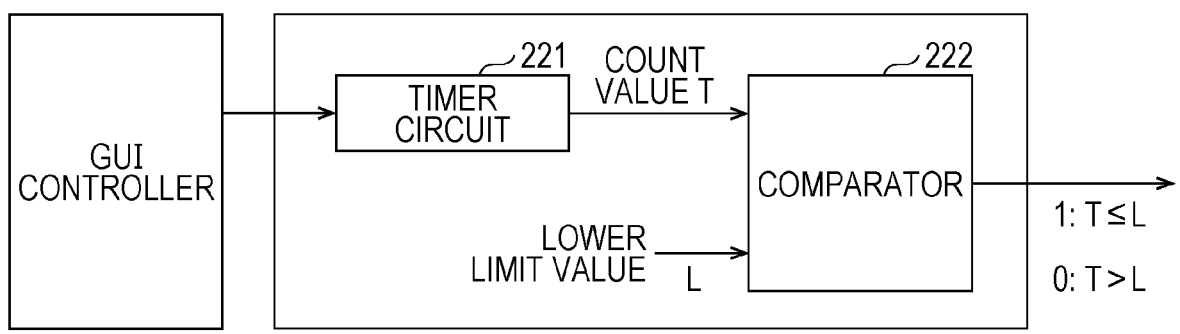
FIG. 13 illustrates a configuration of an operation monitoring unit according to one or more embodiments.

FIG. 13 illustrates a configuration of an operation monitoring unit 108 according to one or more embodiments. As illustrated in FIG. 13, the operation monitoring unit 108 of one or more embodiments includes a timer circuit 221, and a comparator 222.

(7-1) Timer Circuit 221

When a screen including a setting item is displayed, the timer circuit 221 counts an elapsed time from when the setting item is operated until when another setting item is operated.

(7-2) Comparator 222

The comparator 222 determines whether a count value of the timer circuit 221 is equal to or less than the lower limit value. The lower limit value is set to a time interval at the time when a touch panel display 1001 of an image forming apparatus 1000 is smoothly operated. According to the operability evaluation for a considerable number of users, it is said that a time interval of operations is approximately 2 seconds when a user smoothly performs input operation on the image forming apparatus 1000 with a favorable tempo. If the time interval from the immediately preceding operation is equal to or shorter than 2 seconds, it is assumed that the user is not confused by the operation and remains in a calm emotion. In view of the above, the comparator 222 determines whether the count value of the timer circuit 221 is equal to or less than 2 seconds, and if it is equal to or less than 2 seconds, a signal level of output signals is set to be High, and positive logic is output. If it exceeds 2 seconds, the comparator 222 sets the signal level of the output signals to be Low, and outputs negative logic.

The operation monitoring unit 108 of one or more embodiments uses the output of the comparator 222 as a signal indicating a truth value of whether it is a reference face. That is, if the output of the operation monitoring unit 108 is positive logic, it indicates that the operation input time point indicated by a key code and a hierarchical value output from a GUI controller 104 is appropriate as a timing for obtaining a reference face. On the other hand, if the output of the operation monitoring unit 108 is negative logic, it indicates that the operation input time point indicated by a key code and a hierarchical value output from the GUI controller 104 is inappropriate as a timing for obtaining a reference face.

[8] Flowchart Changes

Figure 14A:
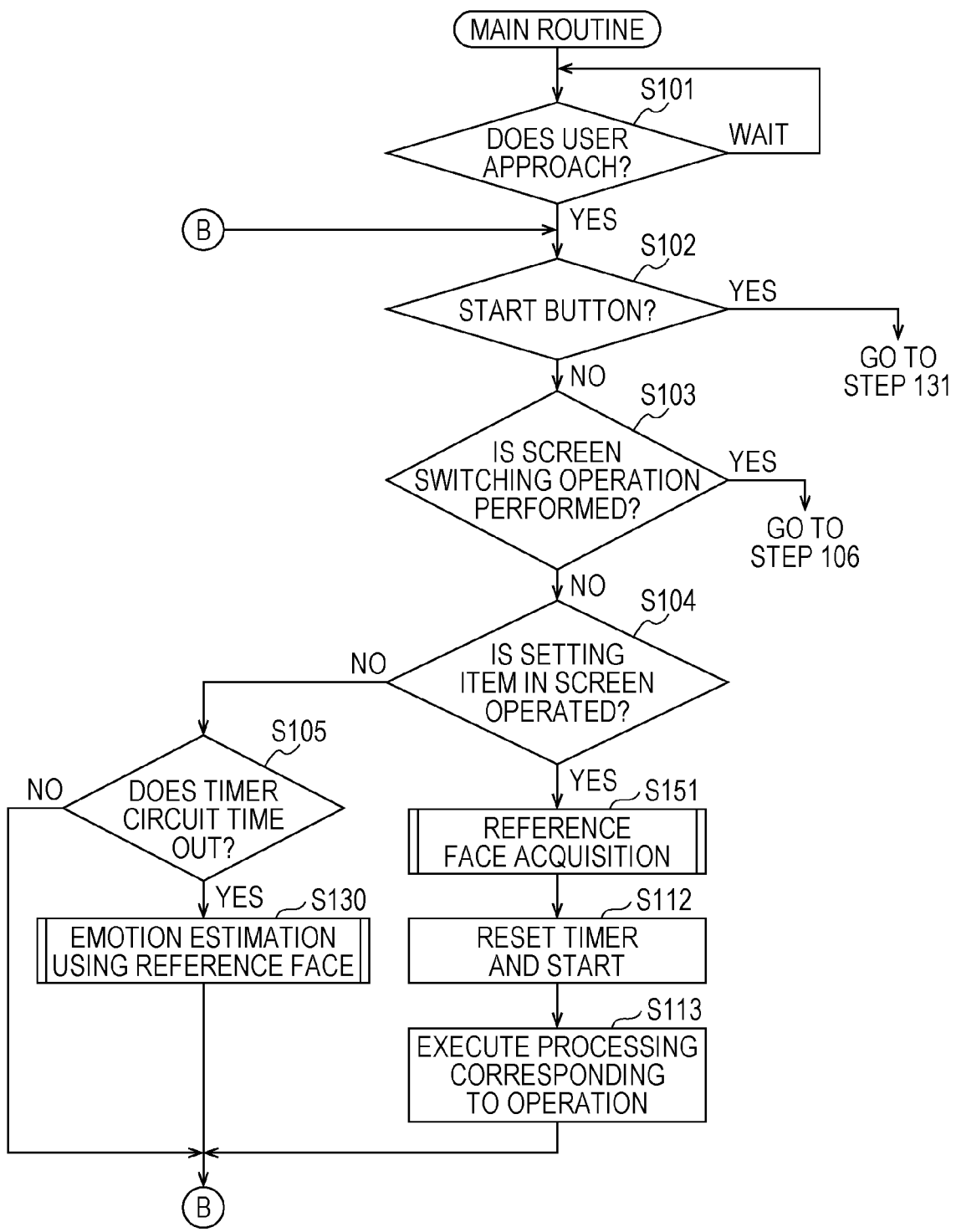
FIG. 14A illustrates a main routine according to one or more embodiments.

FIG. 14A illustrates a main routine according to one or more embodiments. FIG. 14A is different from the main routine according to the above embodiments (FIG. 7) in the processing to be performed when step S104 is Yes. That is, while it is determined whether operation performed on the touch panel display 1001 is a specific operation when step S104 is Yes (step S111 in FIG. 7) in FIG. 7, FIG. 14A is different from FIG. 7 in that, when step S104 is Yes, acquisition of a reference face is executed (step S151) without determining whether the specific operation is performed (step S111), and that the timer circuit 221 is reset to start counting (step S112) after the reference face is obtained, processing corresponding to the operation is executed (step S113), and the process returns to a loop of steps S102 to S105.

Figure 14B:
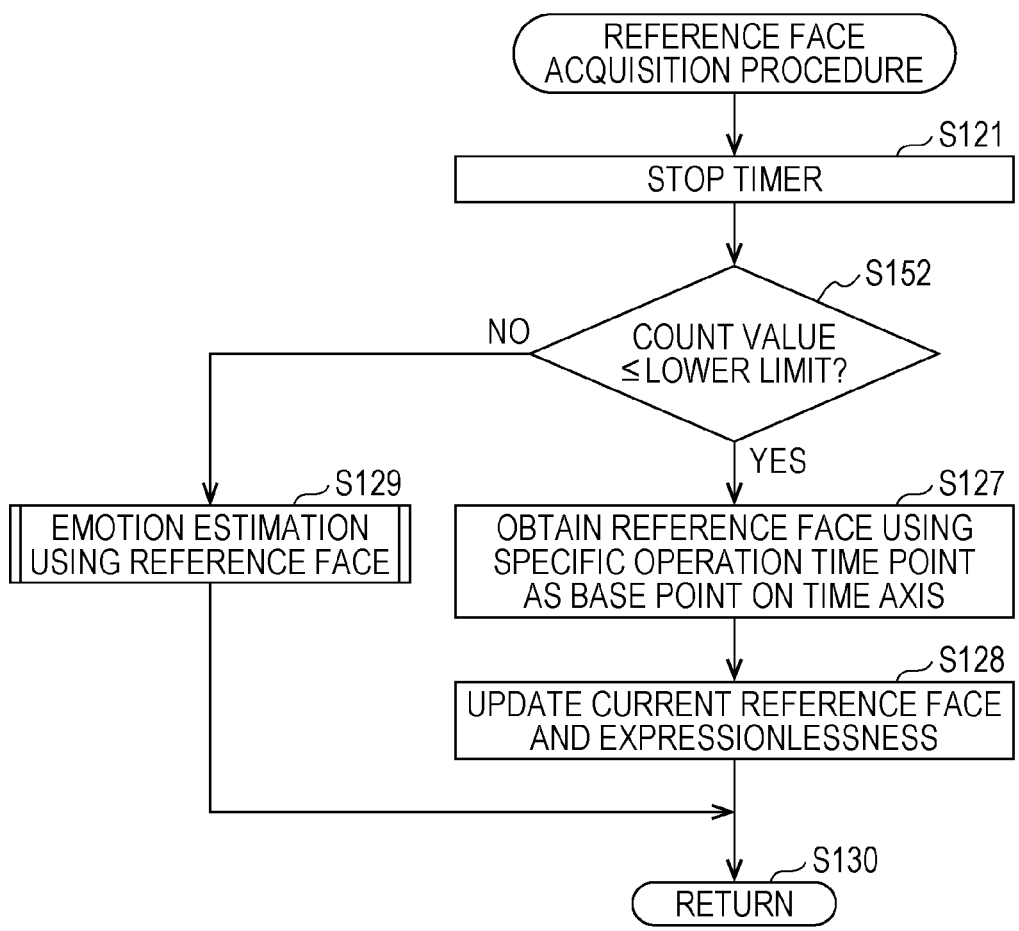
FIG. 14B illustrates a flowchart of a procedure for obtaining a reference face according to one or more embodiments.

FIG. 14B illustrates a flowchart of a procedure for obtaining a reference face according to one or more embodiments. The flowchart of FIG. 14B is different from the flowchart of FIG. 8 according to the above embodiments in the process after the timer is stopped. That is, FIG. 14B is different in that, after the counting of the timer circuit 221 is stopped, it is determined whether the count value of the timer circuit 221 is lower than the lower limit value described above (step S152) without performing conversion of the degree of being expressionless (step S122) or comparison with the threshold value (step S123).

Furthermore, it is different in that a reference face is obtained from, using an input time point at which the key input operation is performed as a base point, a frame image having a time code after the base point (step S127) without performing comparison with the current reference face or update of the degree of being expressionless (steps S125 and S126 in FIG. 8).

[9] Operation of Operation Monitoring Unit 108 in One or More Embodiments

When a screen is displayed in the main routine of FIG. 14A, in step S106, the timer circuit 221 is rest and counting operation starts. Thus, the count value of the timer circuit 221 represents the elapsed time up to that time. In obtaining a reference face in FIG. 14B, the comparator 222 compares the count value of the timer circuit 221 with the lower limit (step S152 in FIG. 14B). If the count value of the timer circuit 221 is equal to or less than the lower limit, a reference face is obtained (step S127) in a similar manner to the above embodiments.

If the count value of the timer circuit 221 exceeds the lower limit value, according to the flowchart of FIG. 10, emotion estimation using the reference face is executed (step S128) and the process returns to the main routine (step S130) in a similar manner to the above embodiments.

In resuming the main routine process, the timer circuit 221 is reset, and the counting performed by the timer circuit 221 starts (step S112 in FIG. 7). Subsequently, processing corresponding to the operated setting item is executed (step S113).

Figure 15:
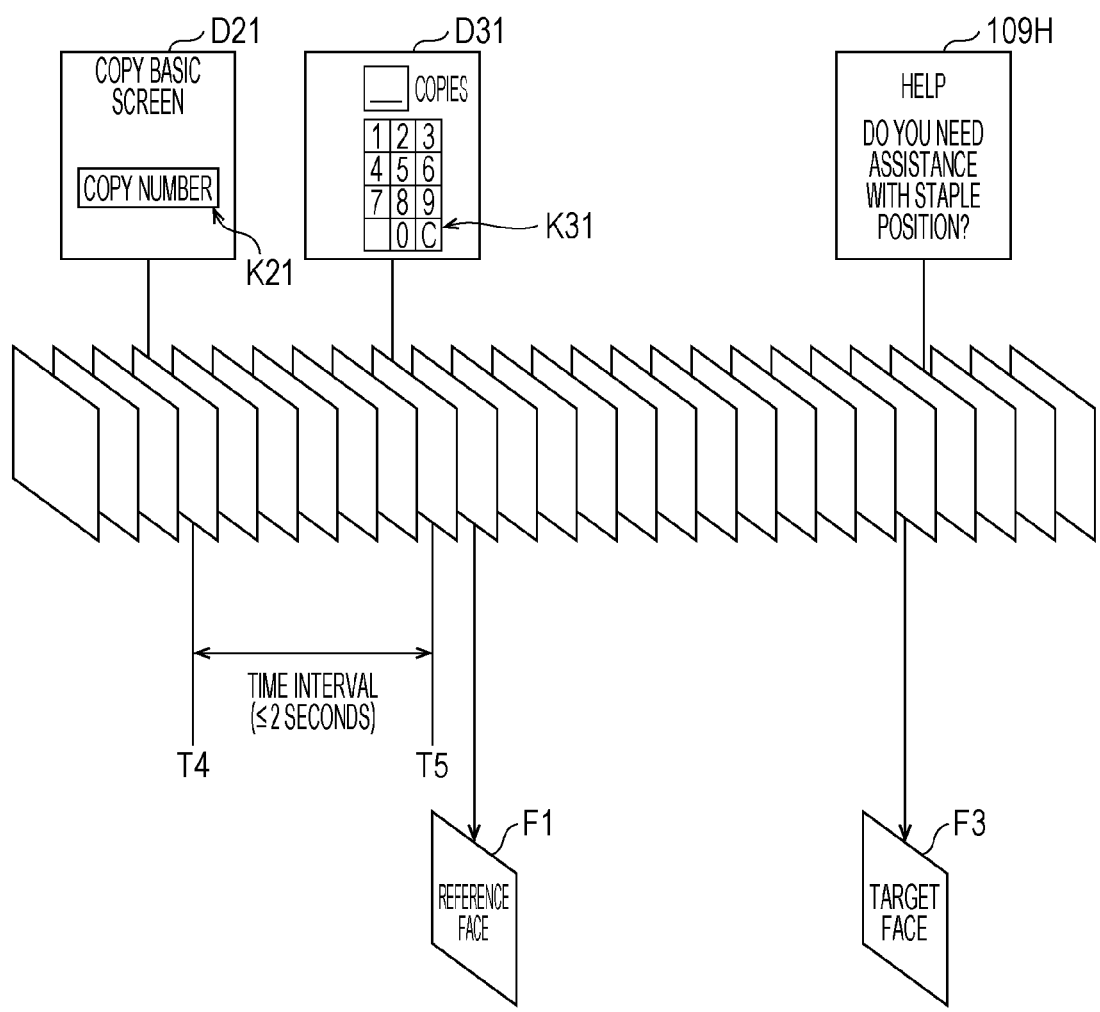
FIG. 15 is a timing chart illustrating a process of selecting a reference face according to one or more embodiments.

A process of selecting a reference face according to one or more embodiments is illustrated in a timing chart of FIG. 15.

It is assumed that a copy basic screen D21 of a second hierarchy is displayed, a copy number key K21 for a copy number setting is operated, and then a copy number input key K31 is pressed. At this time, since the elapsed time from the immediately preceding operation is counted by the timer circuit 221, the elapsed time from when the copy number key K21 is operated until when the copy number input key K31 is pressed is compared with the lower limit value of 2 seconds. When the elapsed time from when the screen is displayed becomes equal to or lower than the lower limit value, the signal level of the output signals of the comparator 222 becomes High, and positive logic is output. At this time, the pressing of the copy number input key K31 is determined to be appropriate as a reference face timing with no delay caused by determination made by the user, and a frame image captured in the vicinity of the time point at which the copy number input key K31 is pressed is set to be a facial image of a reference face.

[9] Summary

As described above, according to aforementioned embodiments, it is highly likely that the touch panel display 1001 is smoothly operated with a favorable tempo, and a camera 1005 captures an emotionally neutral facial expression if the time interval from when the immediately preceding setting item is operated until when one setting item is operated is equal to or less than a predetermined threshold value. Such a facial expression of the user is determined as a reference face, whereby the reference face can be specified with simple processing.

[10] Variations

Although the embodiments of the present invention has been described above, it is needless to say that the present invention is not limited to the aforementioned embodiments, and the following variations can be considered.

(1) In the aforementioned embodiments, a reference face is obtained using, as a base point, the input time point at which an input operation of the softkey that is a specific setting item is performed. Here, assuming that there is a reasonable time delay from the base point until when the reference face appears, a reference face may be obtained after the reasonable delay time has elapsed. The reasonable delay time may be set to a value corresponding to, for example, a time required for extension and contraction of human facial muscles or mastication muscles. Furthermore, a value having been subject to fine adjustment according to a frame rate of a camera 1005 may be adopted.

(2) Although setting items on setting screens of third or lower hierarchies have been set as specific setting items, setting items on setting screens of the first and second hierarchies may be subject to, as specific setting items, weighting based on a degree of being expressionless in an operation/emotion table 202. At this time, the degree of being expressionless of the setting items on the setting screens of the first and second hierarchies may be set higher or lower than the setting items on the setting screens of the third hierarchy.

When a setting item, such as copy, is selected in the setting items on the basic screen, a reference face may be obtained according to the degree of being expressionless of the copy setting item. Furthermore, an elapsed time from the display of the basic screen is counted, and if the elapsed time is less than the lower limit value described in one or more embodiments (e.g., when a time interval from the display of the basic screen is 0.3 seconds), a reference face may be obtained from the frame image captured by the camera 1005.

(3) Copy is generally selected as a default function of an image forming apparatus 1000. If a default function is selected in such a manner, a hierarchical value of a screen may be set depending on the number of switching operations required to reach the screen from a copy basic screen.

Furthermore, a level of a setting item on each setting screen may be determined according to the number of switching operations (hierarchical value) from the copy basic screen.

(4) In obtaining a reference face, emotion estimation may be performed on a frame image having a time code after the input time point of a specific operation. More specifically, in the present variation, a face recognizer 112 of an image processor 109 obtains a reference face from a frame image having a time code after the reference time to obtain facial feature points. An inter-frame feature amount calculator 113a calculates an inter-frame feature amount on the basis of the facial feature points obtained from the reference face, and SVMs 114a, b, c, and so on determine which of the seven emotions described above the inter-frame feature amount calculated in such a manner corresponds to.

The face recognizer 112, the inter-frame feature amount calculator 113a, and the SVMs 114a, b, c, and so on repeatedly perform the process described above on a plurality of frame images having a time code after the reference time. If an expressionless emotion is estimated for any of the frame images, the facial image obtained from the frame image is set as a reference face. Since a period for estimating whether it is expressionless is limited to a time point after the input time point of the specific operation, emotion estimation can be carried out on the basis of the reference face with no expression without an increase in processing load.

(5) Although the setting item has been described as a setting item (softkey) defined by screen description data, it may be a hardware key arranged on the image forming apparatus 1000. In particular, the number of copes is input using a numerical pad that is a hardware key in many cases. Such a numerical pad that is a hardware key may be subject to weighting based on a degree of being expressionless as a specific operation. At this time, the key code of the numerical pad that is a hardware key and the type of being a hardware key may be associated with the degree of being expressionless, and written in the operation/emotion table 202.

(6) Although an operation monitoring unit 108 and an image processor 109 have been described to obtain a reference face, extract facial feature points, and estimate an emotion in executing a copy print job, the present invention is not limited thereto. Acquisition of a reference face, extraction of facial feature points, and emotion estimation may be carried out at the time of executing fax and scanning.

(7) Although the operation monitoring unit 108 and the image processor 109 have been described to be components incorporated in the image forming apparatus 1000, the present invention is not limited thereto. The operation monitoring unit 108 and the image processor 109 may be provided as applications of a server that can be accessed by the image forming apparatus 1000. Furthermore, in a case where a plurality of image forming apparatuses exists in a network system to which the image forming apparatus 1000 belongs, the operation monitoring unit 108 that is a server application may update a degree of being expressionless according to big data of operation performed on those image forming apparatuses and the operation history.

(8) In a case where a terminal that requests a print job is a smartphone, a tablet terminal, or a laptop computer, and includes a camera for user selfie, applications of the operation monitoring unit 108 and the image processor 109 may be installed in the terminal, and the applications for performing processing of the operation monitoring unit 108 and the image processor 109 may be caused to execute acquisition of the reference face, extraction of the facial feature points, and emotion estimation. When the user is confused about setting the printing conditions on the terminal, an appropriate help screen can be displayed on the terminal, and the efficiency of the printing condition setting can be improved.

(9) A timer circuit 221 and a comparator 222 may be provided in the image forming apparatus 1000 according to the above embodiments, and may be caused to determine, at the time when a specific operation is performed, whether a time interval from the immediately preceding operation is equal to or less than the 2-second time interval. Then, if the time interval from the immediately preceding operation is equal to or less than 2 seconds, regardless of whether the operation is a specific operation associated with a facial expression of the user or whether a degree of being expressionless for weighting the operation exceeds a threshold value, a reference face may be obtained using the input time point of the operation as a reference time.

Furthermore, if the operation in which the time interval from when the immediately preceding operation is performed is equal to or less than 2 seconds is the specific operation, the reference face may be updated using a size of a weighting factor for weighting the operation as a requirement.

(10) Any value can be used as a hierarchical value as long as a depth of a hierarchy of a setting screen can be expressed. For example, the number of pressing operations of a switching item on a setting screen may be counted, and the counted number may be used as a hierarchical value. Furthermore, each identification number of screen description data or a numerical value obtained by converting the identification number may be used as a hierarchical value.

(11) Although setting items for input of the number of copies, copy mode selection, document size input, paper size input, a staple function, and a card copy function have been associated with a facial expression of the user using the operation/emotion table 202 in the aforementioned embodiments, that is merely an example. The setting items to be described below may be associated with a facial expression of the user.

Setting Item for Destination Input

There are various methods of destination input that are valid at the time of executing a scanning function, such as selection input from pre-registered destinations, direct input from a soft keyboard, selection input from a transmission history, and input based on a destination search. Using the operation/emotion table 202, setting items corresponding to those input items may be associated with a facial expression of the user, and may be weighted by a weighting factor.

Setting Item for Document Image Quality Input

A setting screen of document image quality receives any setting of text, text/photograph (printed photograph), photograph (printed photograph), faint character document, or copy document. Using the operation/emotion table 202, those setting items may be associated with a facial expression of the user, and may be weighted by a weighting factor.

Sheet Face Adjustment

In scanning, it is possible to set whether or not to remove show-through and yellowing. Using the operation/emotion table 202, show-through removal and yellowing removal may be associated with a facial expression of the user, and may be weighted by a weighting factor.

Color Specification

As a color specifying function, any of settings of color, auto color, full color, gray scale, and monochrome binary is possible. Using the operation/emotion table 202, color, auto color, full color, gray scale, and monochrome binary may be associated with a facial expression of the user, and may be weighted by a weighting factor.

File Format Specification

As file format specification, any of settings of PDF, compact PDF, PPTX, TIFF, JPEG, XPS, and compact XPS is possible. Using the operation/emotion table 202, PDF, compact PDF, PPTX, TIFF, JPEG, XPS, and compact XPS may be associated with a facial expression of the user, and may be weighted by a weighting factor.

Furthermore, in a case where PDF is selected as a file format, it is possible to select whether or not to apply encryption or signature, whether or not to make outline PDF, and whether or not to apply stamp composition. In the case of using stamp composition, it is possible to select whether to use an image stamp or to use a character stamp. Using the operation/emotion table 202, those setting items may be associated with a facial expression of the user, and may be weighted by a weighting factor.

Page Setting

As a page setting function, any of settings of multiple pages, page division, and batch transmission of all files is possible. Using the operation/emotion table 202, those multiple pages, page division, and batch transmission of all files may be associated with a facial expression of the user, and may be weighted by a weighting factor.

Composition of Date/Time, Page Number, and Stamp

A date/time, a page number, and a stamp can be combined to image data obtained by scanning a document. Using the operation/emotion table 202, whether or not to combine those date/time, page number, and stamp may be associated with a facial expression of the user, and may be weighted by a weighting factor. As an output setting from a document, any of single side to single side, single side to double side, double side to single side, double side to double side, and spread direction can be specified. Using the operation/emotion table 202, output specification of those mentioned above may be associated with a facial expression of the user, and may be weighted by a weighting factor.

Specification of Document to be Read

For a document to be read, specification of a type, such as a thin paper document, a Z-folded document, same-width mixture, different-width mixture, a long-length document, and a book document, is accepted. Using the operation/emotion table 202, those types of documents may be associated with a facial expression of the user, and may be weighted by a weighting factor.

When a book document is selected as a document type, it is possible to specify spread, division, front/back cover, margin removal, centering, frame erasing, opening direction document, and crease erasing. Using the operation/emotion table 202, specification of those mentioned above may be associated with a facial expression of the user, and may be weighted by a weighting factor.

Furthermore, in setting a document size, using the operation/emotion table 202, specification of the A series, B series, and inch series, and each of 8×13, 8K, 16K, and postcards may be associated with a facial expression of the user, and may be weighted by a weighting factor.

Using the operation/emotion table 202, each of specification of consecutive page shooting, specification of index documents, availability of consecutive reading, automatic rotation, and necessity of character reproduction may be associated with a facial expression of the user, and may be weighted by a weighting factor.

A function exerted by a finisher 1004 is not limited to stapling, and a punch function and a two-fold function may be associated with a facial expression of the user using the operation/emotion table 202. In addition, in a similar manner to stapling, selection of whether to target a corner of a sheet face or to make two holes may be accepted in the punch function as well. Furthermore, using the operation/emotion table 202, respective setting items for accepting left-opening binding, right-opening binding, top-opening binding, and automatic binding may be associated with a facial expression of the user, and may be weighted by a weighting factor.

(12) Although an emotion estimator 113 has been described to calculate a linear feature and a triangle feature that are inter-frame feature amounts for 24 facial feature points illustrated in FIG. 11, the present invention is not limited thereto. Emotion estimation may be carried out using other feature points or feature amounts. For example, a linear feature or a triangle feature having been subject to a horizontal Prewitt filter or a vertical Prewitt filter may be used for emotion estimation. Here, the horizontal Prewitt filter is a primary differential filter for extracting edges in the horizontal direction, and the vertical Prewitt filter is a primary differential filter for extracting edges in the vertical direction.

Furthermore, it may be a local intensity histogram (LIH) feature amount obtained by calculating a luminance histogram of a local area and connecting it, a local binary pattern (LBP) feature amount tolerant of a change in luminance and capable of extracting intensity texture, a center symmetric local binary pattern (CS-LBP) feature amount capable of expressing texture regardless of a change in luminance, a Haar-like feature amount indicating the sum of luminance changes between multiple areas in the image, or a histogram of gradient (HOG) feature amount representing image gradient intensity as a histogram of each direction.

Moreover, an emotion of the user may be determined with a facial expression pattern using a contraction amount of facial muscles as an element as disclosed in JP 2002-258682 A being compared with a predetermined standard facial expression pattern to calculate a degree of appearance of display, or a distance between end points of the mouth or the like, a length of a line edge, or a shape of an edge may be used as disclosed in JP 2005-056388 A.

Although the emotion estimator 113 performs emotion estimation based on a linear feature and a triangle feature using SVMs 114*a*, *b*, *c*, and so on, adaptive boosting that learns and uses a plurality of strong discriminators may be used. Alternatively, support vector regression (SVR) obtained by extending an SVM to a regression type may be used.

(13) Although the image forming apparatus 1000 has been described to be a multifunction peripheral, the present invention is not limited thereto. It may be a peripheral device (printer, scanner) of a personal computer, or may be a fax that is a communication device. Furthermore, it may be a label printing machine, a postcard printing machine, a production printing machine, a ticketing machine, or an amusement machine.

The embodiments of the present invention are useful as an image forming apparatus expected to be used by an unspecified number of users, and may be used in various industrial fields such as, in addition to the industrial fields of office automation equipment and information equipment, retailing, leasing, real estate, and publishing.

According to the embodiments of the present invention, an image acquirer obtains, as a reference face, a facial image captured by an imager at a time point when a user performs input operation without delay and a facial expression of the user is assumed to be a reference for a change in facial expression. With the reference face being obtained through such a process, a facial image in which no contraction of facial muscles appears in any of the upper face, the center of the face, and the lower face can be regarded as a reference face. If emotion estimation is carried out on the basis of the reference face, a confused emotion based on a mixed facial expression of sorrow and antipathy or a confused emotion based on a mixed facial expression of happiness and antipathy can be captured, whereby an appropriate help can be presented.

Which one of facial images of the user is to be used as a reference for emotion estimation is determined from operation performed on a setting item of printing conditions, whereby the user is not required to make pre-registration for obtaining a reference face. Therefore, in an image forming apparatus expected to be used by an unspecified number of people, appropriate help based on emotion estimation can be executed.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An image forming apparatus comprising:
an imaging device that captures a user facial image and a reference facial image used for determining a change in a facial expression;
a processor that determines an emotion in the user facial image based on an amount of the change in the facial expression from the reference facial image, and performs message support corresponding to the emotion in the user facial image; and
a user interface that detects an input operation by a user without delay in setting a printing condition when a print job is executed in response to a request made by the user, wherein
the processor obtains the reference facial image captured by the imaging device at a time point when the user interface detects the input operation without delay and the facial expression is assumed to be a reference for the change in the facial expression,
the printing condition includes a plurality of setting items, and any one of the setting items is a specific setting item determined in advance for which the input operation made by the user does not delay,
the user interface detects an operation for the specific setting item as the input operation made by the user without delay,
the image forming apparatus further comprises:
a memory that stores a weighting factor table that indicates weighting of each of the setting items,
the weighting based on the weighting factor indicates a degree of delay of the input operation made by the user for a target setting item, and
among the setting items, the specific setting item is weighted by the weighting factor lower than a predetermined threshold value.

2. The image forming apparatus according to claim 1, further comprising:
a user interface controller that causes the user interface to display each of a plurality of hierarchized setting screens according to a screen switching operation made by the user, wherein
the weighting based on the weighting factor is performed according to a hierarchical value of a setting screen to which the target setting item belongs, and
the hierarchical value indicates a number of switching operations counted from a top of a hierarchical structure of the setting screens required to reach the setting screen to which the target setting item belongs.

3. The image forming apparatus according to claim 1, wherein
in a case where a setting item having the weighting factor lower than the threshold value exists in the setting items, the setting item becomes the specific setting item, and
the processor updates the reference facial image using a size of the weighting factor that weights the specific setting item.

4. The image forming apparatus according to claim 1, further comprising:
a calculator that calculates an execution frequency of the setting items on a setting screen, wherein
the weighting based on the weighting factor is performed according to the execution frequency of the setting item to be weighted.

5. The image forming apparatus according to claim 1, further comprising:
a counter that counts a time interval from when an operation for an immediately preceding setting item is received until when the operation for the specific setting item is received, wherein
the processor:
obtains the reference facial image in a case where the counted time interval is lower than an upper limit value of a residence time, and
does not obtain the reference facial image in a case where the time interval until when the operation for the specific setting item is received exceeds the upper limit value of the residence time.

6. The image forming apparatus according to claim 5, wherein
in a case where, while counting of the time interval starts at a time point when the operation for the immediately preceding setting item is received, a count value of the counter exceeds the upper limit value of the residence time without the specific setting item being operated,
or in a case where, while the specific setting item is operated, the weighting factor of the specific setting item exceeds the predetermined threshold value,
the user facial image is selected from facial images captured by the imaging device after a time point at which the residence time has elapsed or after a time point at which the input operation for the specific setting item is detected.

7. An image forming apparatus comprising:
an imaging device that captures a user facial image and a reference facial image used for determining a change in a facial expression;
a processor that determines an emotion in the user facial image based on an amount of the change in the facial expression from the reference facial image, and performs message support corresponding to the emotion in the user facial image; and
a user interface that detects an input operation by a user without delay in setting a printing condition when a print job is executed in response to a request made by the user, wherein
the processor obtains the reference facial image captured by the imaging device at a time point when the user interface detects the input operation without delay and the facial expression is assumed to be a reference for the change in the facial expression, the printing condition includes a plurality of setting items, and any one of the setting items is a specific setting item determined in advance for which the input operation made by the user does not delay, the user interface detects an operation for the specific setting item as the input operation made by the user without delay, and the specific setting item is, among the setting items, a setting item that sets a number of copies, a setting item that sets a color mode of an image to be formed, or a setting item that sets a size of a sheet onto which the image to be formed is transferred.

8. The image forming apparatus according to claim 7, further comprising:

a counter that counts a time interval from when one input operation is received until when another input operation is received, wherein in a case where the time interval from when the one input operation is received until when the other input operation is received is lower than a threshold value, the user interface detects the input operation as the input operation made by the user without delay.

9. The image forming apparatus according to claim 7, wherein the processor extracts a facial feature point that characterizes the reference facial image and a facial feature point that characterizes the user facial image, and calculates a feature amount corresponding to a positional relationship between the facial feature point that characterizes the reference facial image and the facial feature point that characterizes the user facial image, and the amount of the change in the facial expression is the feature amount corresponding to the positional relationship.

10. An image forming apparatus comprising:

an imaging device that captures a user facial image and a reference facial image used for determining a change in a facial expression;

a processor that determines an emotion in the user facial image based on an amount of the change in the facial expression from the reference facial image, and performs message support corresponding to the emotion in the user facial image; and a user interface that detects an input operation by a user without delay in setting a printing condition when a print job is executed in response to a request made by the user, wherein the processor obtains the reference facial image captured by the imaging device at a time point when the user interface detects the input operation without delay and the facial expression is assumed to be a reference for the change in the facial expression, the processor extracts a facial feature point that characterizes the reference facial image and a facial feature point that characterizes the user facial image, and calculates a feature amount corresponding to a positional relationship between the facial feature point that characterizes the reference facial image and the facial feature point that characterizes the user facial image, the amount of the change in the facial expression is the feature amount corresponding to the positional relationship, the processor extracts the facial feature point from an eyebrow, eyelid, nose, lip, and mouth angle of the reference facial image, and an eyebrow, eyelid, nose, lip, and mouth angle of the user facial image, the feature amount is a linear feature and/or a triangle feature, the linear feature indicates a ratio between a length of a straight line connecting facial feature points extracted from the reference facial image and a length of a straight line connecting the facial feature points extracted from the user facial image, and the triangle feature is based on a ratio between a triangular area having the facial feature points extracted from the reference facial image as vertices and a triangular area having facial feature points extracted from the user facial image as vertices.

11. The image forming apparatus according to claim 10, further comprising:

a plurality of support vector machines (SVMs), wherein each of the SVMs casts one vote on, among a plurality of emotions defined in an emotion model, an emotion corresponding to the feature amount, and an emotion to be output as a result of determination of the emotion is, among the emotions defined in the emotion model, an emotion having a top number of votes obtained from the SVMs.

12. The image forming apparatus according to claim 11, wherein the message support is performed in a case where, as a result of voting performed by the SVMs, an emotion of happiness and an emotion of antipathy are ranked high, or an emotion of sorrow and the emotion of antipathy are ranked high.

* * * * *